(12) United States Patent
Ito

(10) Patent No.: US 11,274,621 B2
(45) Date of Patent: *Mar. 15, 2022

(54) AIR FLOW MEASUREMENT DEVICE

(71) Applicant: DENSO CORPORATION, Kariya (JP)

(72) Inventor: Kengo Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/090,955

(22) Filed: Nov. 6, 2020

(65) Prior Publication Data

US 2021/0054798 A1 Feb. 25, 2021

Related U.S. Application Data

(63) Continuation of application No. 16/598,441, filed on Oct. 10, 2019, now Pat. No. 10,975,793, which is a continuation of application No. PCT/JP2018/009850, filed on Mar. 14, 2018.

(30) Foreign Application Priority Data

Apr. 14, 2017 (JP) .............................. JP2017-080779

(51) Int. Cl.
    *F02D 41/18*   (2006.01)
    *F02D 41/26*   (2006.01)
    *G01F 1/696*   (2006.01)
    *G01F 1/72*    (2006.01)

(52) U.S. Cl.
    CPC ........... *F02D 41/18* (2013.01); *F02D 41/263* (2013.01); *G01F 1/696* (2013.01); *G01F 1/72* (2013.01); *F02D 2200/04* (2013.01)

(58) Field of Classification Search
    CPC ........ F02D 41/18; F02D 41/26; F02D 41/263; F02D 41/264; F02D 41/187; F02D 45/00; F02D 2200/04; G01F 1/00; G01F 1/696; G01F 1/6965; G01F 1/72; G06F 19/00
    USPC ......... 701/101–105, 107, 111, 114; 123/494; 73/114.37, 114.48
    See application file for complete search history.

(56) References Cited

U.S. PATENT DOCUMENTS

| | | | |
|---|---|---|---|
| 6,556,929 B1 * | 4/2003 | Kleinhans | F02D 41/187 702/45 |
| 6,672,146 B1 | 1/2004 | Kobayashi | |
| 10,975,793 B2 * | 4/2021 | Ito | F02D 41/18 |
| 2006/0224298 A1 | 10/2006 | Lang | |

(Continued)

FOREIGN PATENT DOCUMENTS

| | | |
|---|---|---|
| JP | 2014-20212 | 2/2014 |
| JP | 2016-109625 | 6/2016 |

(Continued)

*Primary Examiner* — John Kwon
*Assistant Examiner* — Johnny H Hoang
(74) *Attorney, Agent, or Firm* — Nixon & Vanderhye P.C.

(57) ABSTRACT

An air flow measurement device that measures an air flow rate based on an output value of a sensing unit attached in an environment in which air flows, the air flow measurement device is provided. The air flow measurement device may calculate an average air amount, which is an average value of the air flow rate, from the output value. The air flow measurement device may calculate a pulsation maximum value, which is a maximum value of the air flow rate, from the output value.

13 Claims, 25 Drawing Sheets

(56) References Cited

U.S. PATENT DOCUMENTS

2018/0299309 A1 10/2018 Matsumoto
2020/0040834 A1 2/2020 Ito

FOREIGN PATENT DOCUMENTS

| WO | 2018/190059 | 10/2018 |
| WO | 2018/190060 | 10/2018 |

* cited by examiner

FIG. 13

|  | PULSATION FREQUENCY F1[Hz] | ... | PULSATION FREQUENCY Fn[Hz] |
|---|---|---|---|
| AVERAGE AIR AMOUNT Gave1[g/s] | SLOPE C11 INTERCEPT B11 | ... | SLOPE Cn1 INTERCEPT Bn1 |
| — | ... | ... | ... |
| AVERAGE AIR AMOUNT Gaven[g/s] | SLOPE C1n INTERCEPT B1n | ... | SLOPE Cnn INTERCEPT Bnn |

FIG. 15

PULSATION AMPLITUDE A1

|  | PULSATION FREQUENCY F1[Hz] | – | PULSATION FREQUENCY Fn[Hz] |
|---|---|---|---|
| AVERAGE AIR AMOUNT Gave1[g/s] | CORRECTION AMOUNT Q111 | ... | CORRECTION AMOUNT Q1n1 |
| – | ... | ... | ... |
| AVERAGE AIR AMOUNT Gaven[g/s] | CORRECTION AMOUNT Q11n | ... | CORRECTION AMOUNT Q1nn |

PULSATION AMPLITUDE A2

|  | PULSATION FREQUENCY F1[Hz] | – | PULSATION FREQUENCY Fn[Hz] |
|---|---|---|---|
| AVERAGE AIR AMOUNT Gave1[g/s] | CORRECTION AMOUNT Q211 | ... | CORRECTION AMOUNT Q2n1 |
| – | ... | ... | ... |
| AVERAGE AIR AMOUNT Gaven[g/s] | CORRECTION AMOUNT Q21n | ... | CORRECTION AMOUNT Q2nn |

⋮

PULSATION AMPLITUDE An

|  | PULSATION FREQUENCY F1[Hz] | – | PULSATION FREQUENCY Fn[Hz] |
|---|---|---|---|
| AVERAGE AIR AMOUNT Gave1[g/s] | CORRECTION AMOUNT Qn11 | ... | CORRECTION AMOUNT Qnn1 |
| – | ... | ... | ... |
| AVERAGE AIR AMOUNT Gaven[g/s] | CORRECTION AMOUNT Qn1n | ... | CORRECTION AMOUNT Qnnn |

FIG. 17

PULSATION AMPLITUDE A < As

| | PULSATION FREQUENCY F1[Hz] | ... | PULSATION FREQUENCY Fn[Hz] |
|---|---|---|---|
| AVERAGE AIR AMOUNT Gave1[g/s] | SLOPE C11 INTERCEPT B11 | ... | SLOPE Cn1 INTERCEPT Bn1 |
| — | ... | ... | ... |
| AVERAGE AIR AMOUNT Gaven[g/s] | SLOPE C1n INTERCEPT B1n | ... | SLOPE Cnn INTERCEPT Bnn |

PULSATION AMPLITUDE As < A

| | PULSATION FREQUENCY F1[Hz] | ... | PULSATION FREQUENCY Fn[Hz] |
|---|---|---|---|
| AVERAGE AIR AMOUNT Gave1[g/s] | SLOPE D11 INTERCEPT E11 | ... | SLOPE Dn1 INTERCEPT En1 |
| — | ... | ... | ... |
| AVERAGE AIR AMOUNT Gaven[g/s] | SLOPE D1n INTERCEPT E1n | ... | SLOPE Enn INTERCEPT Enn |

FIG. 19

PULSATION RATE P < Ps

|  | PULSATION FREQUENCY F1[Hz] | - | PULSATION FREQUENCY Fn[Hz] |
|---|---|---|---|
| AVERAGE AIR AMOUNT Gave1[g/s] | SLOPE C11 INTERCEPT B11 | ... | SLOPE Cn1 INTERCEPT Bn1 |
| - | ... | ... | ... |
| AVERAGE AIR AMOUNT Gaven[g/s] | SLOPE C1n INTERCEPT B1n | ... | SLOPE Cnn INTERCEPT Bnn |

PULSATION AMPLITUDE Ps < P

|  | PULSATION FREQUENCY F1[Hz] | - | PULSATION FREQUENCY Fn[Hz] |
|---|---|---|---|
| AVERAGE AIR AMOUNT Gave1[g/s] | SLOPE D11 INTERCEPT E11 | ... | SLOPE Dn1 INTERCEPT En1 |
| - | ... | ... | ... |
| AVERAGE AIR AMOUNT Gaven[g/s] | SLOPE D1n INTERCEPT E1n | ... | SLOPE Dnn INTERCEPT Enn |

FIG. 24

DUCT DIAMETER H1

| | PULSATION FREQUENCY F1[Hz] | — | PULSATION FREQUENCY Fn[Hz] |
|---|---|---|---|
| AVERAGE AIR AMOUNT Gave1[g/s] | SLOPE C111 INTERCEPT B111 | ... | SLOPE C1n1 INTERCEPT B1n1 |
| — | ... | ... | ... |
| AVERAGE AIR AMOUNT Gaven[g/s] | SLOPE C11n INTERCEPT B11n | ... | SLOPE C1nn INTERCEPT B1nn |

DUCT DIAMETER H2

| | PULSATION FREQUENCY F1[Hz] | — | PULSATION FREQUENCY Fn[Hz] |
|---|---|---|---|
| AVERAGE AIR AMOUNT Gave1[g/s] | SLOPE C211 INTERCEPT B211 | ... | SLOPE C2n1 INTERCEPT B2n1 |
| — | ... | ... | ... |
| AVERAGE AIR AMOUNT Gaven[g/s] | SLOPE C21n INTERCEPT B21n | ... | SLOPE C2nn INTERCEPT B2nn |

⋮

DUCT DIAMETER Hn

| | PULSATION FREQUENCY F1[Hz] | — | PULSATION FREQUENCY Fn[Hz] |
|---|---|---|---|
| AVERAGE AIR AMOUNT Gave1[g/s] | SLOPE Cn11 INTERCEPT Bn11 | ... | SLOPE Cnn1 INTERCEPT Bnn1 |
| — | ... | ... | ... |
| AVERAGE AIR AMOUNT Gaven[g/s] | SLOPE Cn1n INTERCEPT Bn1n | ... | SLOPE Cnnn INTERCEPT Bnnn |

AIR FLOW MEASUREMENT DEVICE

CROSS REFERENCE TO RELATED APPLICATIONS

The present application is a continuation application of U.S. application Ser. No. 16/598,441, filed Oct. 10, 2019, which is a continuation application of International Patent Application No. PCT/JP2018/009850 filed on Mar. 14, 2018, which designated the U.S. and claims the benefit of priority from Japanese Patent Application No. 2017-080779 filed on Apr. 14, 2017. The entire disclosures of all of the above applications are incorporated herein by reference.

TECHNICAL FIELD

The present disclosure relates to an air flow measurement device.

BACKGROUND

As an example of an air flow measurement device, a control device for an internal combustion engine has been proposed. The control device calculates a pulsation amplitude ratio and a pulsation frequency, and further calculates a pulsation error from the pulsation amplitude ratio and the pulsation frequency.

SUMMARY

The present disclosure provides an air flow measurement device that measures an air flow rate based on an output value of a sensing unit attached in an environment in which air flows. The air flow measurement device may calculate an average air amount, which is an average value of the air flow rate, from the output value. The air flow measurement device may calculate a pulsation maximum value, which is a maximum value of the air flow rate, from the output value.

BRIEF DESCRIPTION OF DRAWINGS

The features and advantages of the present disclosure will become more apparent from the following detailed description made with reference to the accompanying drawings. In the drawings:

FIG. 13 is a diagram showing a two-dimensional map according to the fifth embodiment;

FIG. 15 is a diagram showing a three-dimensional map according to a first modification of the fifth embodiment;

FIG. 17 is a diagram showing a three-dimensional map according to a second modification of the fifth embodiment;

FIG. 19 is a diagram showing a three-dimensional map according to the third modification of the fifth embodiment;

FIG. 24 is a diagram showing a three-dimensional map according to the seventh embodiment;

DETAILED DESCRIPTION

Figure 1:
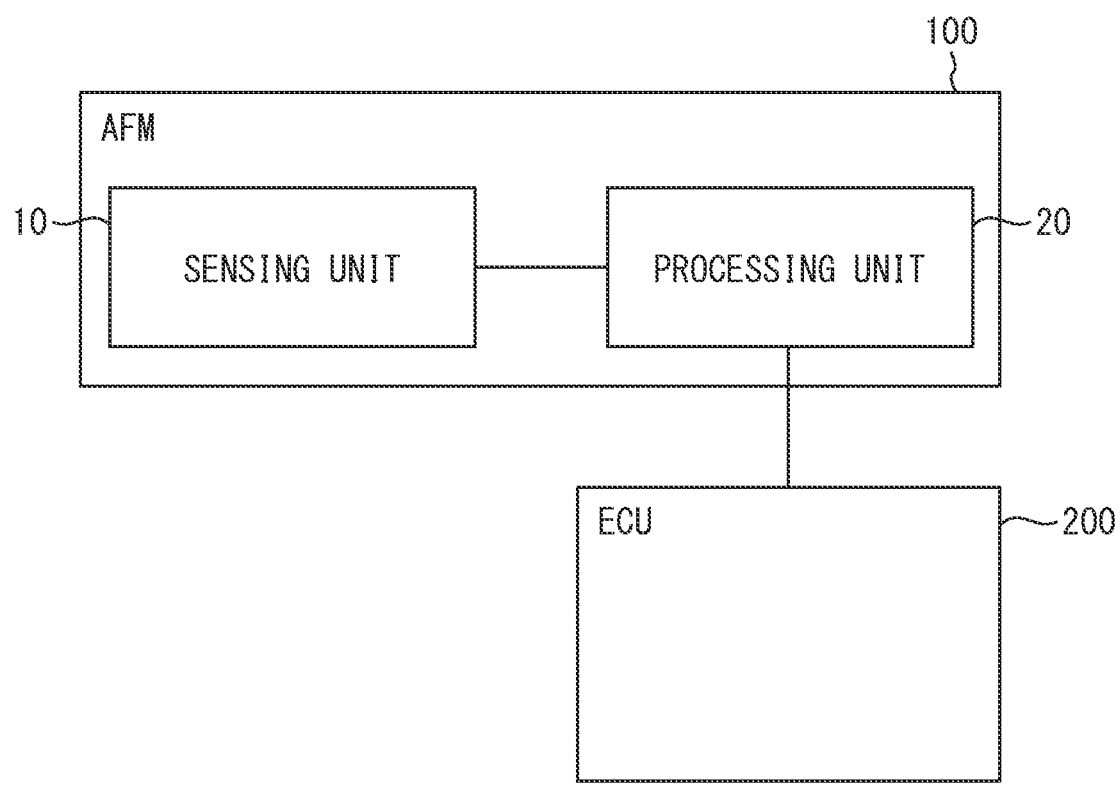
FIG. 1 is a block diagram showing a schematic configuration of an AFM according to a first embodiment.

For example, as an example of an air flow measurement device, a control device for an internal combustion engine has been proposed. The control device calculates a pulsation amplitude ratio and a pulsation frequency, and further calculates a pulsation error from the pulsation amplitude ratio and the pulsation frequency. The control device refers to a pulsation error correction map to acquire a correction coefficient necessary for correcting the pulsation error from the pulsation amplitude ratio and the pulsation frequency. The control device further calculates an air quantity in which the pulsation error has been corrected.

The control device calculates the pulsation amplitude ratio by dividing the pulsation amplitude amount that is the difference between the maximum flow rate and the minimum flow rate during pulsation by the average air amount at that time. The minimum flow rate tends to be a measurement of an unstable phenomenon in terms of fluid dynamics, and the measurement reproducibility and measurement accuracy are inherently deteriorated. Therefore, in the control device, the calculation accuracy of the pulsation amplitude ratio is lowered, and the correction accuracy may be deteriorated accordingly.

An example embodiment of the present disclosure provides an air flow measurement device that measures an air flow rate based on an output value of a sensing unit attached in an environment in which air flows. The air flow measurement device includes an average air amount calculation unit, a pulsation amplitude calculation unit, a pulsation error prediction unit, and a pulsation error prediction unit. The average air amount calculation unit calculates an average air amount, which is an average value of the air flow rate, from the output value. The pulsation amplitude calculation unit calculates a pulsation maximum value, which is a maximum value of the air flow rate, from the output value, and calculates a pulsation amplitude of the air flow rate by taking a difference between the pulsation maximum value and the average air amount. The pulsation error prediction unit predicts a pulsation error of the air flow rate correlated with the pulsation amplitude. The pulsation error correction unit corrects the air flow rate to reduce the pulsation error using the pulsation error predicted by the pulsation error prediction unit.

In the example embodiment of the present disclosure, the air flow measurement device calculates the pulsation amplitude of the air flow rate by taking the difference between the average air amount and the pulsation maximum value. This pulsation maximum value, which is the maximum value of the air flow rate, has higher measurement accuracy than the minimum value of the air flow rate. Therefore, the present disclosure can acquire the pulsation amplitude in which the effect of the pulsation minimum value of the air flow rate having lower measurement accuracy is reduced. The present disclosure predicts the pulsation error correlated with the pulsation amplitude, and corrects the air flow rate to cause the pulsation error smaller. Therefore, the present disclosure enables to enhance the correction accuracy of the air flow rate. That is, the present disclosure enables to acquire the air flow rate in which the pulsation error is reduced.

As follows, multiple embodiments for implementing the present disclosure will be described with reference to the drawings. In each embodiment, portions corresponding to those described in the preceding embodiment are denoted by the same reference numerals, and redundant descriptions will be omitted in some cases. In each embodiment, in a case where only a part of the configuration is described, the other part of the configuration may be applied with reference to the other embodiment described above.

First Embodiment

An air flow measurement device of a first embodiment will be described with reference to FIGS. 1 to 5. As shown in FIG. 1, the present embodiment employs an example in which the air flow rate measurement device is applied to an AFM (air flow meter) 100. That is, the AFM 100 corresponds to the air flow rate measurement device. The AFM 100 is mounted on a vehicle provided with, for example, an internal combustion engine (hereinafter referred to as an engine). The AFM has a thermal air flow rate measurement function for measuring a flow rate of an intake air (hereinafter, air flow rate) taken into a cylinder of the engine. Therefore, the AFM 100 can be regarded as a hot wire-type air flow meter. The air flow rate can also be referred to as an intake air flow rate.

The AFM 100 mainly includes a sensing unit 10 and a processing unit 20. Further, the AFM 100 is electrically connected to an ECU (electronic control unit) 200. The ECU 200 corresponds to an internal combustion engine control device, and is an engine control device having a function of controlling the engine based on a detection signal from the AFM 100 and the like. The detection signal is an electric signal indicating the air flow rate corrected by a pulsation error correction unit 40, which will be described later.

The sensing unit 10 is attached in an intake duct such as an outlet of an air cleaner or an intake pipe, for example, as an environment in which an air flows. For example, the sensing unit 10 is attached in the intake duct in a state of being attached to a passage formation member. In other words, the sensing unit 10 is attached in a sub-bypass passage by being attached to a passage formation member provided with a bypass passage (sub-air passage) and a sub-bypass passage (secondary sub-air passage) through which a part of the intake air flowing in an interior (main air passage) of the intake duct passes. It is noted that, the present disclosure is not limited to the above configuration, and the sensing unit 10 may be attached directly in the main air passage.

The sensing unit 10 includes a well-known heating resistor, a resistance temperature detector, and the like. The sensing unit 10 outputs a sensor signal (output value, output signal) corresponding to the air flow rate flowing through the sub-bypass flow channel to the processing unit 20. It can also be conceived that the sensing unit 10 outputs an output value, which is an electric signal corresponding to the air flow rate flowing through the sub-bypass flow channel, to the processing unit 20.

Meanwhile, in the intake duct, intake pulsation including reverse flow occurs due to reciprocating motion of the piston in the engine or the like. In the sensing unit 10, an error to a true air flow rate occurs in the output value due to an influence of the intake pulsation. In particular, when a throttle valve is operated to a fully open side, the sensing unit 10 is susceptible to the influence of the intake pulsation. Hereinafter, the error caused by the intake pulsation is also referred to as a pulsation error Err. The true value of the air flow rate is an air flow rate which is not affected by the intake pulsation.

The processing unit 20 measures the air flow rate based on the output value of the sensing unit 10, and outputs the measured air flow rate to the ECU 200. The processing unit 20 includes at least one calculation processing device (CPU), and a storage device for storing a program and data. For example, the processing unit 20 is realized by a microcomputer having a storage device readable by a computer. The processing unit 20 performs various calculations with the execution of programs stored in the storage medium by the calculation processing device, measures the air flow rate, and outputs the measured air flow rate to the ECU 200.

The storage device is a non-transitory tangible storage medium for non-transitory storage of computer readable programs and data. The storage medium is realized by a semiconductor memory, a magnetic disk, or the like. The storage device can also be referred to as a storage medium. The processing unit 20 may include a volatile memory for temporarily storing data.

The processing unit 20 has a function of correcting the output value in which the pulsation error Err occurs. In other words, the processing unit 20 corrects the air flow rate at which the pulsation error Err occurs so as to approach a true air flow rate. Therefore, the processing unit 20 outputs to the ECU 200 the air flow rate obtained by correcting the pulsation error Err as the detection signal. It can also be conceived that the processing unit 20 outputs an electric signal indicating the air flow rate to the ECU 200.

Figure 2:
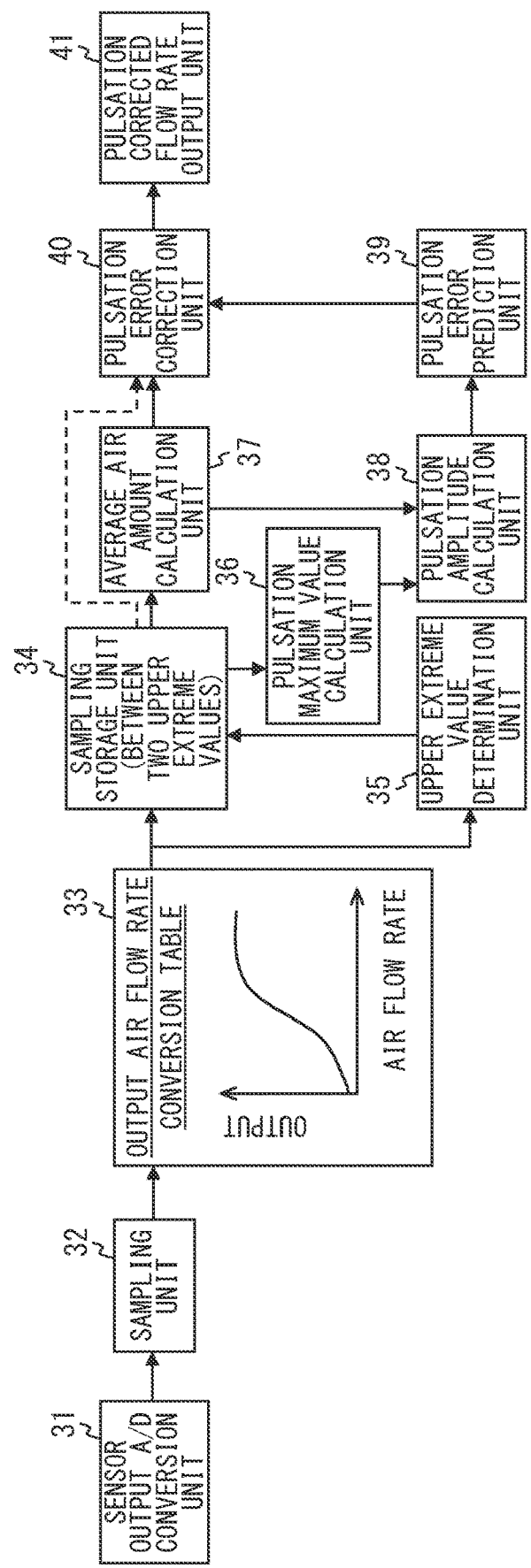
FIG. 2 is a block diagram showing a schematic configuration of a processing unit according to the first embodiment.

The processing unit 20 operates as multiple functional blocks by executing the program. In other words, as shown in FIG. 2, the processing unit 20 has multiple functional blocks 31 to 41. The processing unit 20 includes, as functional blocks, a sensor output A/D conversion unit 31, a sampling unit 32, and an output air flow rate conversion table 33. The processing unit 20 performs A/D (analog to digital) conversion on the output value output from the sensing unit 10 by the sensor output A/D conversion unit 31. Then, the processing unit 20 samples the A/D converted output value by the sampling unit 32, and converts the output value into an air flow rate by the output air flow rate conversion table 33.

The processing unit 20 further includes, as functional blocks, a sampling storage unit 34, an upper extreme value determination unit 35, a pulsation maximum value calculation unit 36, an average air amount calculation unit 37, a pulsation amplitude calculation unit 38, a pulsation error prediction unit 39, a pulsation error correction unit 40, and a pulsation corrected flow rate output unit 41.

Figure 4:
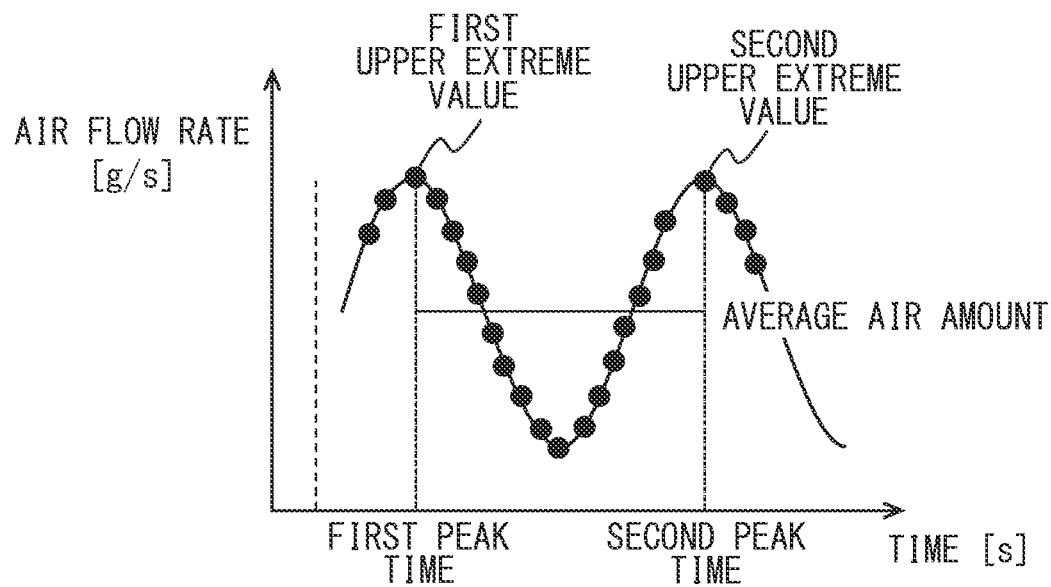
FIG. 4 is a waveform diagram showing a method of determining a measurement period according to the first embodiment.
Figure 5:
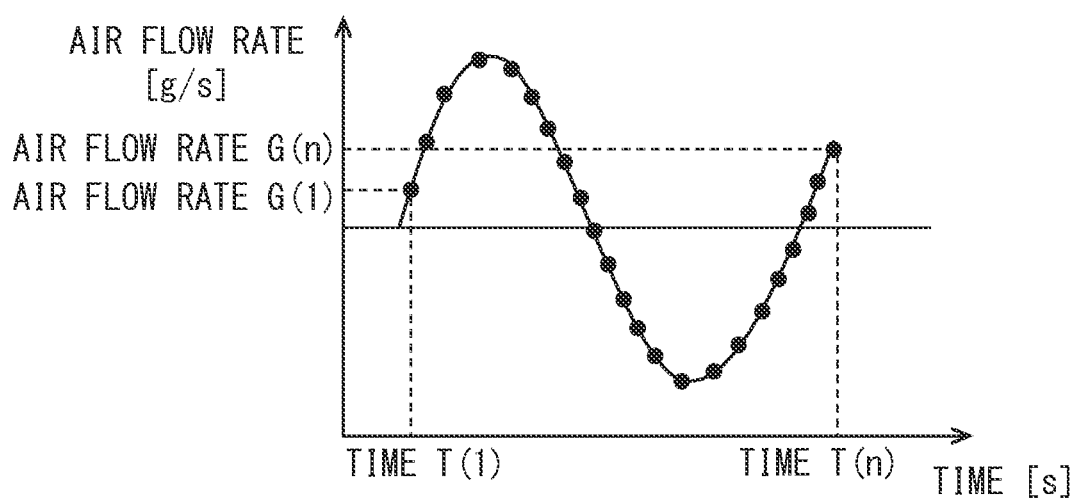
FIG. 5 is a waveform diagram showing a method of calculating an average air amount according to the first embodiment.

The sampling storage unit 34 stores multiple sampling values between the two upper extreme values determined by the upper extreme value determination unit 35. For example, as shown in FIG. 4, the upper extreme value determination unit 35 determines, as a first upper extreme value, a sampling value at which the air flow rate corresponding to the sampling value is switched from an increase to a decrease among the multiple sampling values. Then, the upper extreme value determination unit 35 determines a sampling value at which the air flow rate corresponding to the next sampling value is switched from an increase to a decrease among the multiple sampling values as a second upper extreme value. In other words, the upper extreme value determination unit 35 determines the sampling value at a first peak time as the first upper extreme value, and determines the sampling value at a second peak time, which is the next peak time, as the second upper extreme value. The sampling storage unit 34 stores a sampling value between the first upper extreme value and the second upper extreme value.

This is because a measurement period (calculation period) of an average air amount Gave and a pulsation maximum value Gmax is determined, and the average air amount Gave and the pulsation maximum value Gmax are calculated in the measurement period. In this example, the measurement period is provided between the first upper extreme value and the second upper extreme value. As the number of samplings is larger, the average air amount Gave and the pulsation maximum value Gmax can be calculated more accurately. The average air amount Gave is an average value of the air flow rates in a predetermined period. On the other hand, the pulsation maximum value Gmax is a maximum value of the air flow rate when the air is pulsating.

The pulsation maximum value calculation unit 36 acquires the maximum value of the air flow rate among the multiple sampling values stored in the sampling storage unit 34. That is, the pulsation maximum value calculation unit 36 acquires the maximum value of the air flow rate in the measurement period, that is, a pulsation maximum value Gmax, which is the maximum flow rate, from the output value of the sensing unit 10. In the following description, the minimum value of the air flow rate in the measurement period is also referred to as a pulsation minimum value.

The pulsation maximum value calculation unit 36 may acquire multiple upper extreme values in the air flow rate from the output values, and calculate the pulsation maximum value Gmax from the average value of the multiple upper extreme values. For example, the pulsation maximum value calculation unit 36 acquires the first upper extreme value and the second upper extreme value, and calculates the average value of the first upper extreme value and the second upper extreme value as the pulsation maximum value. As a result, the pulsation maximum value calculation unit 36 can reduce the influence even when an error occurs in either the first upper extreme value or the second upper extreme value. For this reason, the pulsation maximum value calculation unit 36 can improve the calculation accuracy of the pulsation maximum value Gmax. The pulsation maximum value calculation unit 36 may acquire more than three upper extreme values, and calculate the pulsation maximum value Gmax from the average value of the acquired more than three upper extreme values.

The average air amount calculation unit 37 calculates an average value of the air flow rate according to the multiple sampling values stored in the sampling storage unit 34. In other words, the average air amount calculation unit 37 calculates the average air amount Gave of the air flow rate in the measurement period according to the output value of the sensing unit 10.

The average air amount calculation unit 37 calculates the average air amount Gave with the use of, for example, an integrated average. In this example, the calculation of the average air amount Gave will be described with reference to waveforms shown in FIG. 5. For example, the time period from a time T1 to a time Tn is a measurement period, the air flow rate at the time T1 is G1, and the air flow rate at the time Tn is Gn. Then, the average air amount calculation unit 37 calculates the average air amount Gave with the use of Expression 1. In that case, as compared with a case in which the number of samples is small, when the number of samplings is large, the average air amount calculation unit 37 can calculate the average air amount Gave in which the effect of the pulsation minimum value whose detection accuracy is relatively lower is reduced.

$$\text{AVERAGE AIR AMOUNT Gave} = \frac{\sum_{1}^{n} G(t)}{n} \quad \text{(Expression 1)}$$

The average air amount calculation unit 37 may calculate the average air amount Gave by averaging the pulsation minimum value, which is the minimum value of the air flow rate, and the pulsation maximum value during the measurement period. In other words, the average air amount calculation unit 37 calculates the average air amount Gave with the use of Expression 2.

$$\text{AVERAGE AIR AMOUNT Gave} = \frac{\left(\begin{array}{c}\text{PULSATION MAXIMUM VALUE} + \\ \text{PULSATION MINIMUM VALUE}\end{array}\right)}{2} \quad \text{(Expression 2)}$$

The average air amount calculation unit 37 may calculate the average air amount Gave without using a pulsation minimum value whose detection accuracy is lower than the detection accuracy of the maximum value of the air flow rate, or several air amounts of the pulsation minimum value and before and after the pulsation minimum value. As will be described later, the processing unit 20 calculates the pulsation amplitude A from the average air amount Gave and the pulsation maximum value Gmax. Therefore, the processing unit 20 can calculate the pulsation amplitude A in which the effect of the pulsation minimum value is reduced by allowing the average air amount calculation unit 37 to calculate the average air amount Gave without using the pulsation minimum value. In other words, the processing unit 20 calculates the pulsation amplitude A by using the average air amount Gave and the pulsation maximum value Gmax with relatively high detection accuracy, without using the pulsation minimum value with low detection accuracy, when calculating the pulsation amplitude A. Thus, this configuration enables to enhance the calculation accuracy of the pulsation amplitude A.

Figure 3:
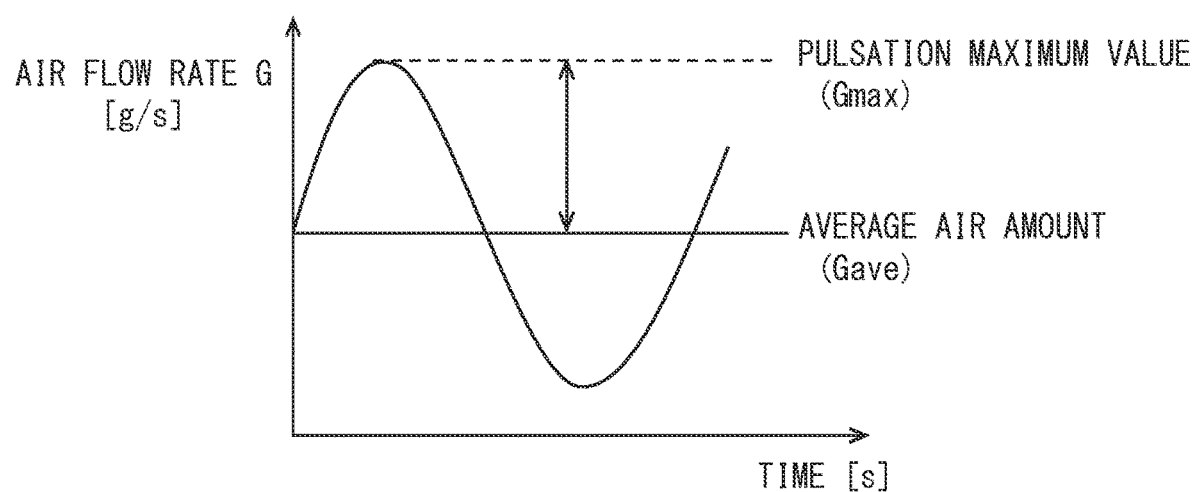
FIG. 3 is a waveform diagram showing a method of calculating a pulsation amplitude according to the first embodiment.

As shown in FIG. 3, the pulsation amplitude calculation unit 38 calculates (acquires) the pulsation amplitude A of the air flow rate by taking the difference between the pulsation maximum value Gmax and the average air amount Gave. That is, the pulsation amplitude calculation unit 38 obtains not the full amplitude of the air flow but the half amplitude of the air flow. This is to reduce the influence of the pulsation minimum value with relatively low detection accuracy, as described above. The pulsation maximum value calculation unit 36 and the pulsation amplitude calculation unit 38 correspond to a pulsation amplitude calculation unit.

The pulsation error prediction unit 39 predicts the pulsation error Err of the air flow rate correlated with the pulsation amplitude A. The pulsation error prediction unit 39 predicts the pulsation error Err of the air flow rate correlated with the pulsation amplitude A by using, for example, a map in which the pulsation amplitude A and the pulsation error Err are associated with each other. In other words, when the pulsation amplitude A is obtained by the pulsation amplitude calculation unit 38, the pulsation error prediction unit 39 extracts the pulsation error Err correlated with the obtained pulsation amplitude A from the map. It can also be conceived that the pulsation error prediction unit 39 acquires the pulsation error Err correlated with the pulsation amplitude A.

In that instance, the AFM 100 includes a map in which the multiple pulsation amplitudes A and the pulsation errors Err correlated to the respective multiple pulsation amplitudes A are associated with each other. Further, the map can be created by confirming a relationship between each pulsation amplitude A and the pulsation error Err correlated with each pulsation amplitude A by an experiment or a simulation using an actual machine. In other words, each pulsation error Err can be conceived to be a value obtained for each pulsation amplitude A when the experiment or a simulation using the actual machine is performed while the value of the pulsation amplitude A is changed. It should be noted that, the map in the embodiment to be described below may be similarly created by implementing an experiment or a simulation or the like using an actual equipment.

As described above, the AFM 100 is disposed in the intake duct with the sensing unit 10 attached to the passage formation member. Therefore, the AFM 100 may not only increase the pulsation error Err as the pulsation amplitude A increases, but also may decrease the pulsation error Err as the pulsation amplitude A increases due to the effect of a shape of the passage formation member or the like. For that reason, in the AFM 100, a relationship between the pulsation amplitude A and the pulsation error Err cannot be expressed by a function in some cases. Therefore, the AFM 100 can predict an accurate pulsation error Err by using the map as described above. In the map, the multiple pulsation amplitudes A and the correction amounts Q correlated with the respective pulsation amplitudes A may be associated with each other.

The AFM 100 may be able to express the relationship between the pulsation amplitude A and the pulsation error Err by a function when the sensing unit 10 is directly disposed in the main air passage. In that instance, the AFM 100 may calculate the pulsation error Err using the above function. Since the AFM 100 has no need to have the map by calculating the pulsation error Err using the function, the storage device can be reduced in capacitance. This also applies to the following embodiments. In other words, in the following embodiments, the pulsation error Err may be obtained by using a function instead of the map.

The pulsation error Err is a difference between the air flow rate, which is obtained from the output value and has not been corrected, and a true value of the air flow rate. That is, the pulsation error Err corresponds to a difference between the air flow rate, which has been converted from the output value by using an output air flow rate conversion table 33, and the true value of the air flow rate. Therefore, the correction amount Q, which is for bringing the air flow rate before correction closer to the true value of the air flow rate, can be acquired if the pulsation error Err is known.

The pulsation error correction unit 40 corrects the air flow rate so that the pulsation error Err is reduced with the use of the pulsation error Err predicted by the pulsation error prediction unit 39. In other words, the pulsation error correction unit 40 corrects the air flow rate so that the air flow rate affected by the intake pulsation approaches the true air flow rate. In this example, the average air amount Gave is adopted as an object to be corrected for the air flow rate.

For example, the pulsation error correction unit 40 obtains the correction amount Q according to the predicted pulsation error Err by using a calculation, a map in which the pulsation error Err and the correction amount Q, or the like. Then, for example, the pulsation error correction unit 40 can correct the air flow rate so that the pulsation error Err becomes small by adding the correction amount Q to the average air amount Gave.

In other words, when the correction amount Q is minus Q1, the pulsation error correction unit 40 adds minus Q1 to the average air amount Gave, that is, subtracts Q1 from the average air amount Gave, thereby being capable of obtaining the corrected air flow rate in which the pulsation error Err is reduced. When the correction amount Q is positive Q2, the pulsation error correction unit 40 adds Q2 to the average air amount Gave, thereby being capable of obtaining a corrected air flow rate in which the pulsation error Err is reduced. It is noted that, the present disclosure is not limited to the above example and may employ another configuration to correct the air flow rate to reduce the pulsation error Err.

In the present embodiment, the air flow rate is corrected so that the pulsation error Err becomes small for the average air amount Gave. However, the present disclosure is not limited thereto. As indicated by a dashed line in FIG. 2, the pulsation error correction unit 40 may correct the air flow rate so that the pulsation error Err becomes small for a value before the calculation by the average air amount calculation unit 37.

The pulsation corrected flow rate output unit 41 outputs an electrical signal indicating the air flow rate which is corrected by the pulsation error correction unit 40. In the present embodiment, the pulsation corrected flow rate output unit 41 that outputs the air flow rate corrected by the pulsation error correction unit 40 to the ECU 200 is employed.

As described above, the AFM 100 calculates the pulsation amplitude A of the air flow rate by taking the difference between the average air amount Gave and the pulsation maximum value Gmax. This pulsation maximum value Gmax has higher measurement accuracy than the minimum value of the air flow rate. Therefore, the AFM 100 can acquire the pulsation amplitude A in which the effect of the pulsation minimum value of the air flow rate having lower measurement accuracy is reduced. The AFM 100 predicts the pulsation error Err corresponding to the pulsation amplitude A, and corrects the air flow rate so that the predicted pulsation error Err becomes smaller. Thus, the AFM 100 is enabled to improve the accuracy of correcting the air flow rate. That is, the AFM 100 enables to acquire the air flow rate in which the pulsation error Err is reduced. In other words, the AFM 100 enables to enhance the robustness in acquiring the parameter for correcting the air flow rate.

In the present embodiment, the AFM 100 including the sensing unit 10 in addition to the processing unit 20 is employed. The present disclosure measures the air flow rate based on the output value of the sensing unit 10, and may include the processing unit 20 including the pulsation maximum value calculation unit 36, the average air amount calculation unit 37, the pulsation amplitude calculation unit 38, the pulsation error prediction unit 39, and the pulsation error correction unit 40.

The first embodiment of the present disclosure has been described above. However, the present disclosure is not limited to the above-mentioned embodiment in any manner, and various modifications are possible within a scope that does not depart from the gist of the present disclosure. Hereinafter, second to ninth embodiments will be described as other embodiments of the present disclosure. Each of the above embodiment and the second to ninth embodiments may be independently implemented, or may be combined appropriately. The present disclosure can be performed by various combinations without being limited to the combination illustrated in the embodiment.

The functions realized by the processing unit 20 may be realized by hardware and software different from those described above, or a combination of the hardware and the software. The processing unit 20 may communicate with, for example, another control device, such as an ECU 200, and the other control device may perform some or all of the processing. The processing unit 20 can be implemented by a digital circuit or an analog circuit, including a large number of logic circuits, when the processing unit 20 is implemented by an electronic circuit.

Second Embodiment

Figure 6:
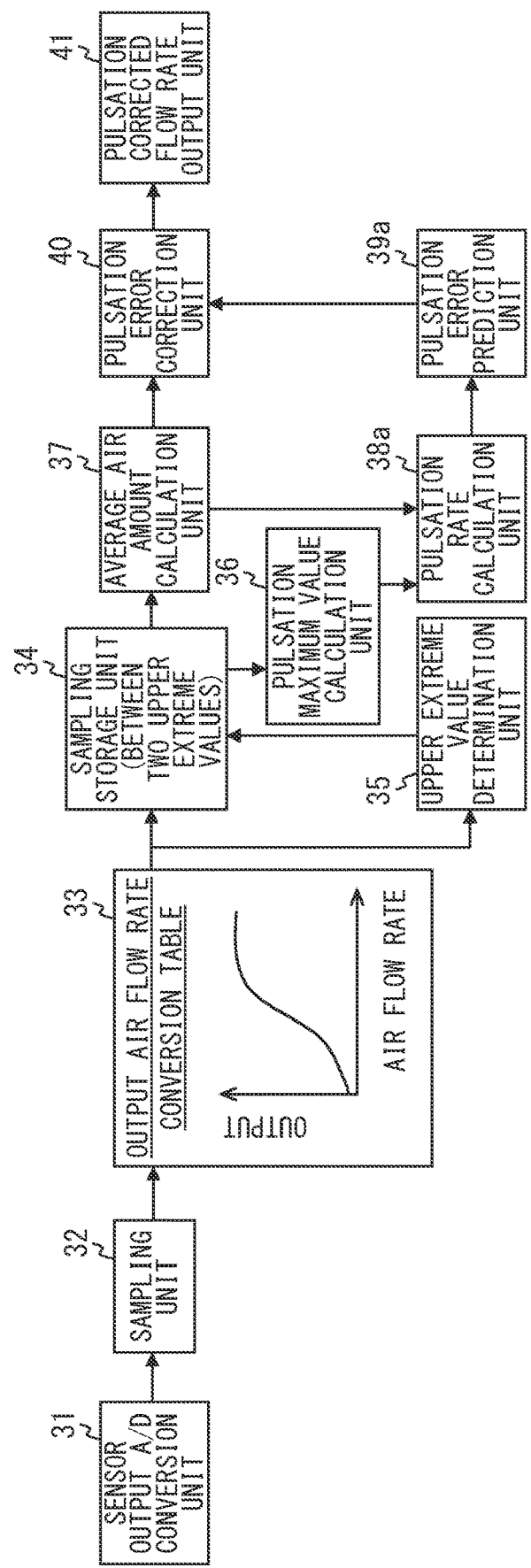
FIG. 6 is a block diagram showing a schematic configuration of a processing unit according to a second embodiment.

An AFM according to a second embodiment will be described with reference to FIG. 6. In the AFM, a part of the processing unit 20 is different from that in the AFM 100. As shown in FIG. 6, the AFM is different from the AFM 100 in that a pulsation rate calculation unit 38*a* and a pulsation error prediction unit 39*a* are included. The AFM includes the pulsation rate calculation unit 38*a* to the AFM 100, and the AFM includes the pulsation error prediction unit 39*a* instead of the pulsation error prediction unit 39 of the AFM 100.

The pulsation rate calculation unit 38*a* divides the pulsation amplitude A by the average air amount Gave to calculate the pulsation rate P of the air flow rate. That is, the pulsation rate calculation unit 38*a* predicts the pulsation amplitude A of the air flow rate similarly to the pulsation amplitude calculation unit 38, and divides the pulsation amplitude A by the average air amount Gave obtained by the average air amount calculation unit 37 to calculate the pulsation rate P of the air flow rate. Specifically, the pulsation rate P=(Gmax−Gave)/Gave×100 is obtained. The pulsation rate P is a parameter having a correlation with the pulsation amplitude A.

The pulsation error prediction unit 39*a* predicts the pulsation error Err correlated with the pulsation rate P as the pulsation error Err correlated with the pulsation amplitude A. The pulsation error prediction unit 39*a* predicts the pulsation error Err correlated with the pulsation rate P by using, for example, a map in which the pulsation rate P and the pulsation error Err are associated with each other. In other words, when the pulsation rate P is obtained by the pulsation rate calculation unit 38*a*, the pulsation error prediction unit 39*a* extracts the pulsation error Err correlated with the obtained pulsation rate P from the map. In that instance, the AFM includes a map in which the multiple pulsation rates P and the pulsation errors Err correlated to the respective multiple pulsation rates P are associated with each other. In other words, each pulsation error Err can be conceived to be a value obtained for each pulsation rate P when the experiment or a simulation using the actual machine is performed while the value of the pulsation rate P is changed.

The AFM of the second embodiment configured as described above can exhibit the similar effects to those of the AFM 100.

Third Embodiment

Figure 7:
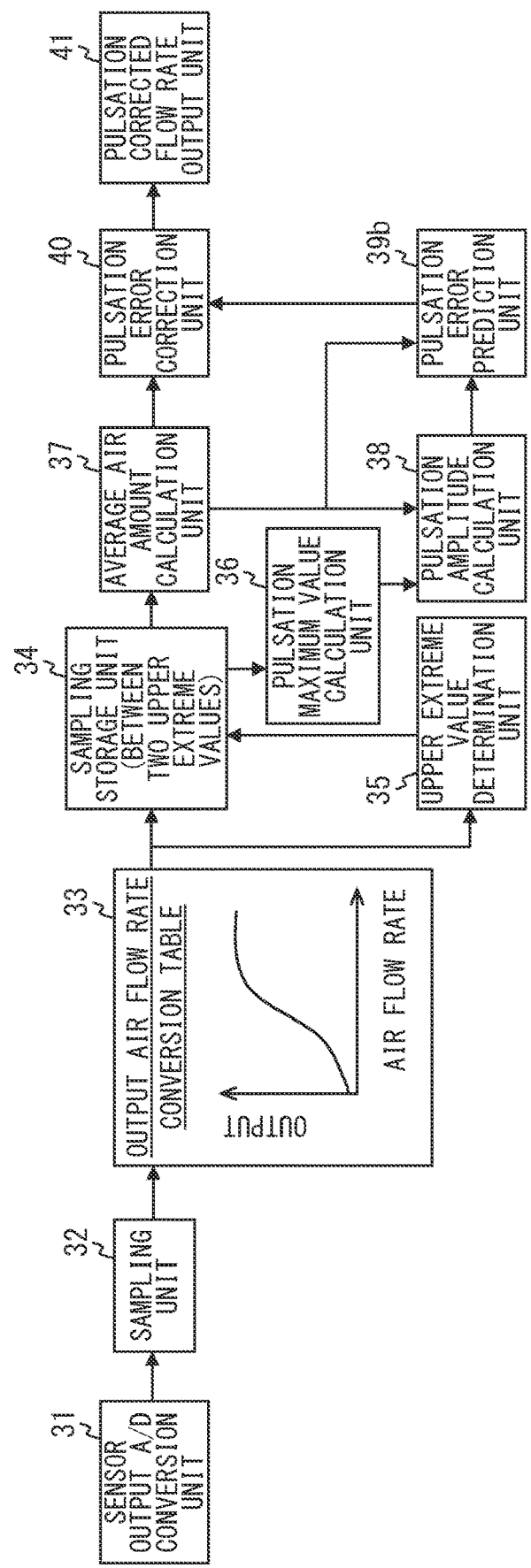
FIG. 7 is a block diagram showing a schematic configuration of a processing unit according to a third embodiment.

An AFM according to a third embodiment will be described with reference to FIG. 7. In the AFM, a part of the processing unit 20 is different from that in the AFM 100. As shown in FIG. 7, the AFM is different from the AFM 100 in that an average air amount Gave obtained by an average air amount calculation unit 37 is input to a pulsation error prediction unit 39*b*.

The pulsation error prediction unit 39*b* predicts a pulsation error Err with the use of the average air amount Gave and a pulsation amplitude A. In other words, the pulsation error prediction unit 39*b* predicts a pulsation error Err also correlated with the average air amount Gave in addition to the pulsation amplitude A.

In that instance, the pulsation error prediction unit 39*b* predicts the pulsation error Err correlated with the average air amount Gave and the pulsation amplitude A with the use of, for example, a map in which the pulsation error Err is associated with the average air amount Gave and the pulsation amplitude A. In other words, when the average air amount Gave is obtained by the average air amount calculation unit 37 and the pulsation amplitude A is obtained by the pulsation amplitude calculation unit 38, the pulsation error prediction unit 39*b* extracts the pulsation error Err correlated with the obtained average air amount Gave and the obtained pulsation amplitude A from the map.

In that instance, the AFM includes a two-dimensional map in which multiple combinations of the multiple average air amounts Gave and the multiple pulsation amplitudes A are associated with the pulsation errors Err correlated with the respective combinations. In the two-dimensional map, for example, the average air amounts Gave1 to Gaven are taken on one axis and the pulsation amplitudes A1 to An are taken on the other axis, and the pulsation errors Err1 to Errn are associated with the respective combinations of the average air amounts Gave1 to Gaven and the pulsation amplitudes A1 to An. For example, the pulsation error Err1 is associated with the average air amount Gave1 and the pulsation amplitude A1. The pulsation error Errn is associated with the average air amount Gaven and the pulsation amplitude An. Each of the pulsation errors Err1 to Errn can be considered to be a value obtained by each of combinations of the pulsation amplitude A and the average air amount Gave when an experiment and a simulation using an actual machine are performed by changing the values of the pulsation amplitude A and the average air amount Gave.

The AFM of the present embodiment configured as described above can exhibit the same effects as those of the AFM 100. Furthermore, the pulsation error Err is also influenced by the average air amount Gave. For that reason, in the present embodiment, since the pulsation error Err correlated with the pulsation amplitude A and the average air amount Gave is predicted and corrected with the use of the pulsation error Err, the correction with higher accuracy can be performed than that when the correction is performed with the use of the pulsation error Err correlated with the pulsation amplitude A.

The pulsation error prediction unit 39b may predict the pulsation error Err with the use of the average air amount Gave and a pulsation rate P. This example can be regarded as a combination of the third embodiment and the second embodiment.

In that instance, the pulsation error prediction unit 39b predicts the pulsation error Err correlated with the average air amount Gave and the pulsation rate P with the use of, for example, a map in which the pulsation error Err is associated with the average air amount Gave and the pulsation rate P. In other words, when the average air amount Gave is obtained by the average air amount calculation unit 37 and the pulsation rate P is obtained by the pulsation rate calculation unit 38a, the pulsation error prediction unit 39b extracts the pulsation error Err correlated with the obtained average air amount Gave and the obtained pulsation rate P from the map.

In that instance, the AFM includes a two-dimensional map in which multiple combinations of the multiple average air amounts Gave and the multiple pulsation rates P are associated with the pulsation errors Err correlated with the respective combinations. In the two-dimensional map, for example, the average air amounts Gave1 to Gaven are taken on one axis and the pulsation rates P1 to Pn are taken on the other axis, and the pulsation errors Err1 to Errn are associated with the respective combinations of the average air amounts Gave and the pulsation rates P. For example, the pulsation error Err1 is associated with the average air amount Gave1 and the pulsation rate P1. The pulsation error Errn is associated with the average air amount Gaven and the pulsation rate Pn. Each of the pulsation errors Err1 to Errn can be considered to be a value obtained by each of combinations of the pulsation rate P and the average air amount Gave when an experiment and a simulation using an actual machine are performed by changing the values of the pulsation rate P and the average air amount Gave.

In this way, the AFM enables to exhibit a similar effect to that of the AFM 100. Since the AFM predicts the pulsation error Err correlated with the pulsation rate P and the average air amount Gave and performs the correction with the use of the pulsation error Err, the correction with higher accuracy can be performed than that when the correction is performed with the use of the pulsation error Err correlated with the pulsation rate P.

Fourth Embodiment

Figure 8:
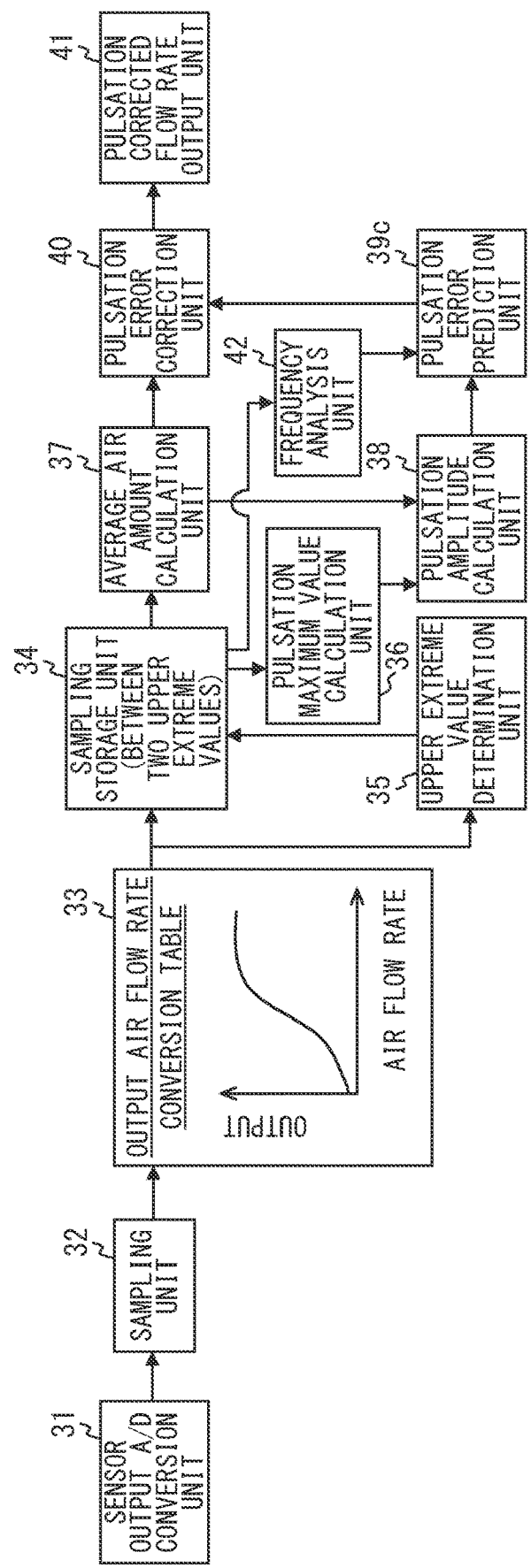
FIG. 8 is a block diagram showing a schematic configuration of a processing unit according to a fourth embodiment.
Figure 9:
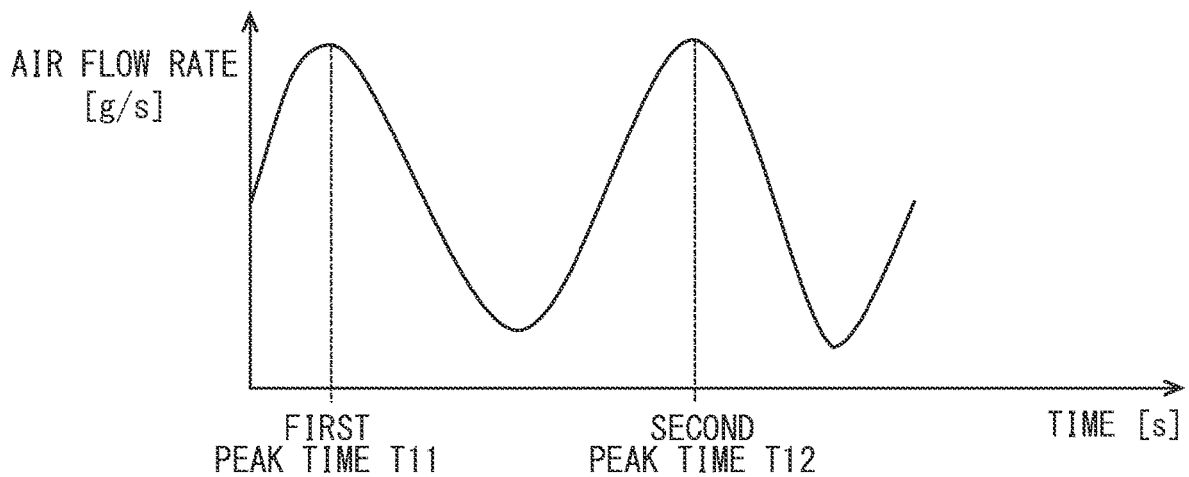
FIG. 9 is a waveform diagram showing a method of calculating a pulsation frequency according to the fourth embodiment.

An AFM according to a fourth embodiment will be described with reference to FIGS. 8 to 10. In the AFM, a part of the processing unit 20 is different from that in the AFM 100. As shown in FIG. 8, the AFM includes a frequency analysis unit 42, and the AFM is different from the AFM 100 in that a pulsation frequency F obtained by the frequency analysis unit 42 is input to a pulsation error prediction unit 39c.

The pulsation error prediction unit 39a predicts a pulsation error Err with the use of a pulsation amplitude A and a pulsation frequency F. In other words, the pulsation error prediction unit 39b predicts the pulsation error Err also correlated with the pulsation frequency F in addition to the pulsation amplitude A. The frequency analysis unit 42 corresponds to a frequency acquisition unit. The pulsation frequency F is a frequency of a pulsation waveform in air, and can also be referred to as a frequency of the air flow rate. In addition, the pulsation frequency F includes not only the first order waves but also the higher order frequencies such as the second order waves and the third order waves.

The frequency analysis unit 42 calculates the pulsation frequency F according to the multiple sampling values stored in a sampling storage unit 34. For example, as shown in FIG. 9, the frequency analysis unit 42 calculates the pulsation frequency F based on an interval between two peaks. In the example of FIG. 9, a time of a first peak is referred to as a first peak time T11, and a time of a second peak is referred to as a second peak time T12. In that case, the pulsation frequency F [Hz]=1/(T12−T11). Therefore, the frequency analysis unit 42 can obtain the pulsation frequency F by calculating 1/(T12−T11).

Figure 10:
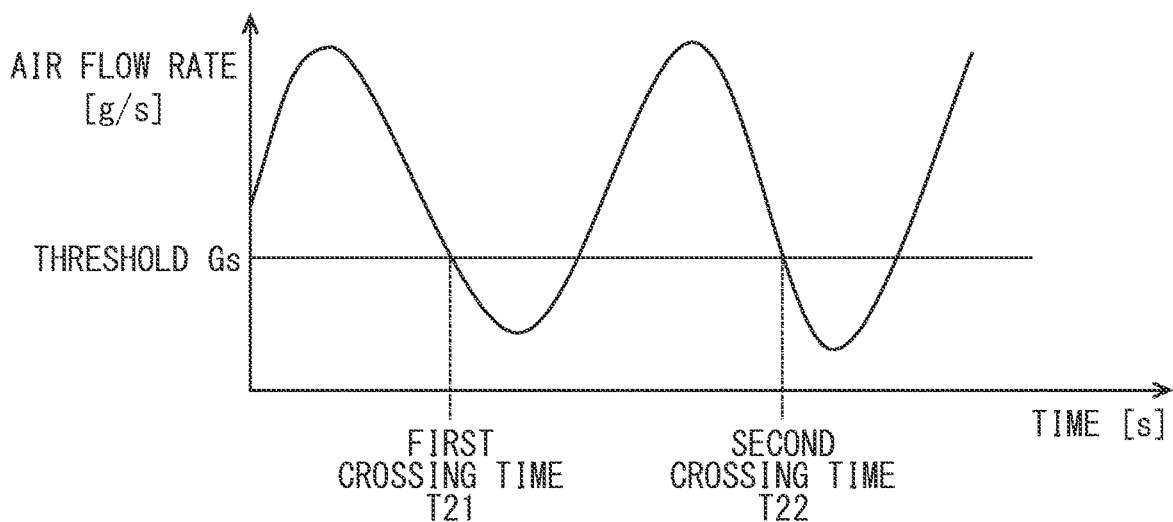
FIG. 10 is a waveform diagram showing another method of calculating the pulsation frequency according to the fourth embodiment.

As shown in FIG. 10, the frequency analysis unit 42 may calculate the pulsation frequency F based on a time spanning a threshold Gs. In the example of FIG. 10, the first time that crosses the threshold Gs is set as a first crossing time T21, and the second time that crosses the threshold Gs is set as a second crossing time T22. In that case, the pulsation frequency F [Hz]=1/(T22−T21). Therefore, the frequency analysis unit 42 can obtain the pulsation frequency F by calculating 1/(T22−T21). Further, the frequency analysis unit 42 may calculate the pulsation frequency F by Fourier-transform.

The pulsation error prediction unit 39c predicts the pulsation error Err correlated with the pulsation frequency F and the pulsation amplitude A with the use of, for example, a map in which the pulsation error Err is associated with the pulsation frequency F and the pulsation amplitude A. In other words, when the pulsation frequency F is obtained by the frequency analysis unit 42 and the pulsation amplitude A is obtained by the standard deviation calculation unit 38, the pulsation error prediction unit 39c extracts the pulsation error Err correlated with the obtained pulsation frequency F and the obtained pulsation amplitude A from the map.

In that case, the AFM includes a two-dimensional map in which multiple combinations of the pulsation frequency F and the pulsation amplitude A and the pulsation error Err correlated with each combination are associated with each other. In the two-dimensional map, for example, pulsation frequencies F1 to Fn are taken on one axis and pulsation amplitudes A1 to An are taken on the other axis, and pulsation errors Err1 to Errn are associated with respective combinations of the pulsation frequencies F and the pulsation amplitudes A. For example, the pulsation error Err1 is associated with the pulsation frequency F1 and the pulsation amplitude A1. The pulsation error Errn is associated with the pulsation frequency Fn and the pulsation amplitude An. Each of the pulsation errors Err1 to Errn can be considered to be a value obtained by each of combinations of the pulsation frequency F and the pulsation amplitude A when the experiment and the simulation using the actual machine are performed by changing the values of the pulsation frequency F and the pulsation amplitude A.

The AFM of the present embodiment configured as described above can exhibit the same effects as those of the AFM 100. Furthermore, the pulsation error Err is also influenced by the pulsation frequency F. For that reason, in the present embodiment, since the pulsation error Err correlated with the pulsation amplitude A and the pulsation frequency F is predicted and corrected with the use of the pulsation error Err, the correction with higher accuracy can be performed than that when the correction is performed with the use of the pulsation error Err correlated with the pulsation amplitude A.

The pulsation error prediction unit 39a may predict a pulsation error Err with the use of a pulsation frequency F and a pulsation rate P. This example can be regarded as a combination of the fourth embodiment and the second embodiment.

The pulsation error prediction unit 39c predicts the pulsation error Err correlated with the pulsation frequency F and the pulsation rate P with the use of, for example, a map in which the pulsation error Err is associated with the pulsation frequency F and the pulsation rate P. In other words, when the pulsation frequency F is obtained by the frequency analysis unit 42 and the pulsation rate P is obtained by the pulsation rate calculation unit 38a, the pulsation error prediction unit 39c extracts the pulsation error Err correlated with the obtained pulsation frequency F and the obtained pulsation rate P from the map.

In that case, the AFM includes a two-dimensional map in which multiple combinations of the pulsation frequency F and the pulsation rate P and the pulsation error Err correlated with each combination are associated with each other. In the two-dimensional map, for example, pulsation frequencies F1 to Fn are taken on one axis and pulsation rates P1 to Pn are taken on the other axis, and pulsation errors Err1 to Errn are associated with respective combinations of the pulsation frequencies F and the pulsation rates P. For example, the pulsation error Err1 is associated with the pulsation frequency F1 and the pulsation rate P1. The pulsation error Errn is associated with the pulsation frequency Fn and the pulsation rate Pn. Each of the pulsation errors Err1 to Errn can be considered to be a value obtained by each of combinations of the pulsation frequency F and the pulsation rate P when the experiment and the simulation using the actual machine are performed by changing the values of the pulsation frequency F and the pulsation rate P.

In this way, the AFM enables to exhibit a similar effect to that of the AFM 100. Since the AFM predicts the pulsation error Err correlated with the pulsation rate P and the pulsation frequency F and performs the correction with the use of the pulsation error Err, the correction with higher accuracy can be performed than that when the correction is performed with the use of the pulsation error Err correlated with the pulsation rate P.

(Modification)

Figure 11:
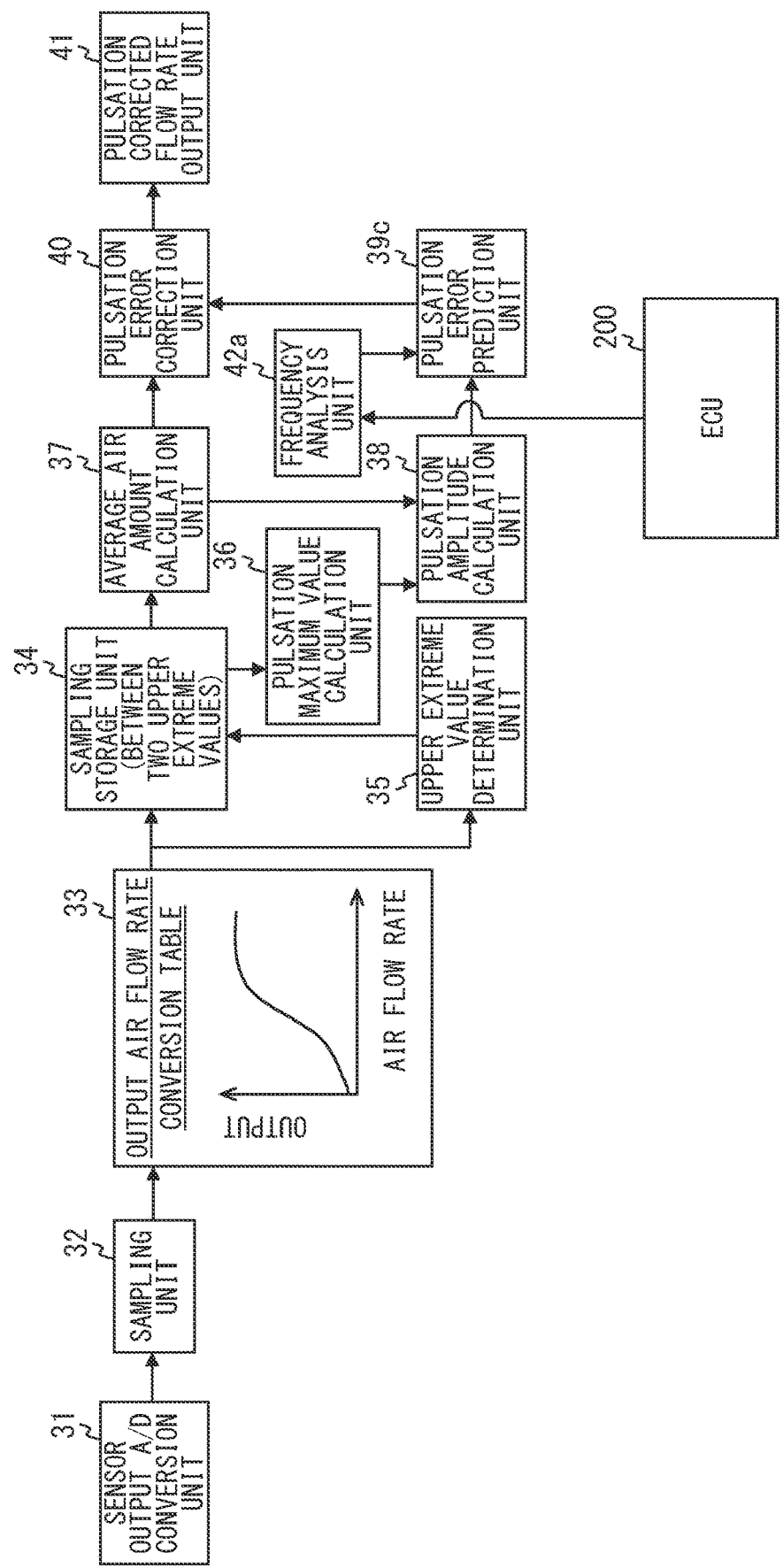
FIG. 11 is a block diagram showing a schematic configuration of a processing unit according to a modification of the fourth embodiment.

A modification of the fourth embodiment will be described with reference to FIG. 11. A frequency analysis unit 42a of this modification is different from the frequency analysis unit 42 in that the frequency analysis unit 42a acquires a pulsation frequency based on a signal from the ECU 200.

The frequency analysis unit 42a acquires, for example, a signal indicating a rotational speed of an engine output shaft (that is, engine rotation speed), a sensor signal of a crank angle sensor, and the like from the ECU 200. Then, the frequency analysis unit 42a calculates the pulsation frequency based on the signal acquired from the ECU 200. In that case, the frequency analysis unit 42a may acquire the pulsation frequency F with the use of, for example, a map in which the engine rotation speed and the pulsation frequency F are associated with each other.

The AFM of the modification can exhibit the same effects as those of the fourth embodiment. Further, since the AFM according to the modification acquires the pulsation frequency based on the information from the ECU 200, the processing load in the AFM can be reduced as compared with the case where the pulsation frequency is calculated according to the multiple sampling values stored in the sampling storage unit 34.

Fifth Embodiment

Figure 12:
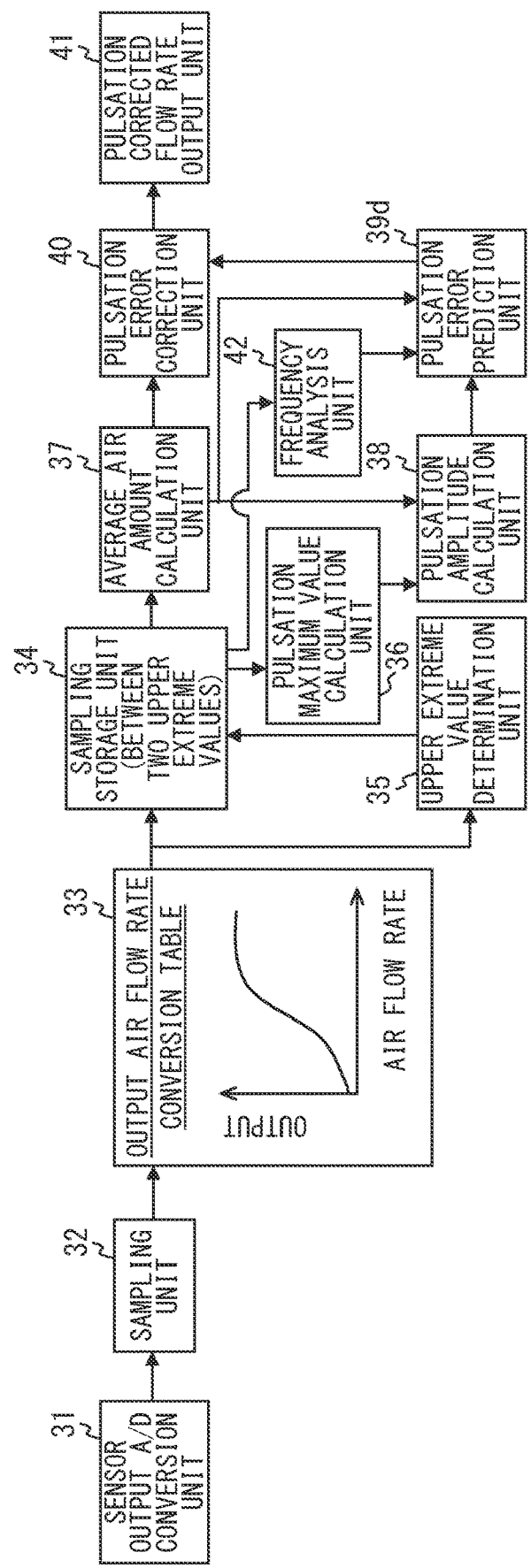
FIG. 12 is a block diagram showing a schematic configuration of a processing unit according to a fifth embodiment.

An AFM according to a fifth embodiment will be described with reference to FIGS. 12 to 14. In the AFM, a part of the processing unit 20 is different from that in the AFM 100. As shown in FIG. 12, the AFM is different from the AFM 100 in that an average air amount Gave obtained by an average air amount calculation unit 37 and a pulsation frequency F obtained by a frequency analysis unit 42 are input to a pulsation error prediction unit 39d.

The pulsation error prediction unit 39d predicts a pulsation error Err with the use of the pulsation frequency F, the average air amount Gave, and the pulsation amplitude A. In other words, the pulsation error prediction unit 39d predicts the pulsation error Err further correlated with the pulsation frequency F and the average air amount Gave in addition to the pulsation amplitude A. Therefore, the fifth embodiment can be regarded as an embodiment in which the first embodiment, the third embodiment, and the fourth embodiment are combined together.

In that instance, the pulsation error prediction unit 39d predicts the pulsation error Err correlated with the pulsation frequency F, the average air amount Gave, and the pulsation amplitude A with the use of, for example, a two-dimensional map shown in FIG. 13 and an error prediction expression to be described in Expression 3.

PULSATION ERROR Err=$Cnn \times A + Bnn$     (Expression 3)

In the error prediction expression, Cnn is a slope and Bnn is an intercept.

Figure 14:
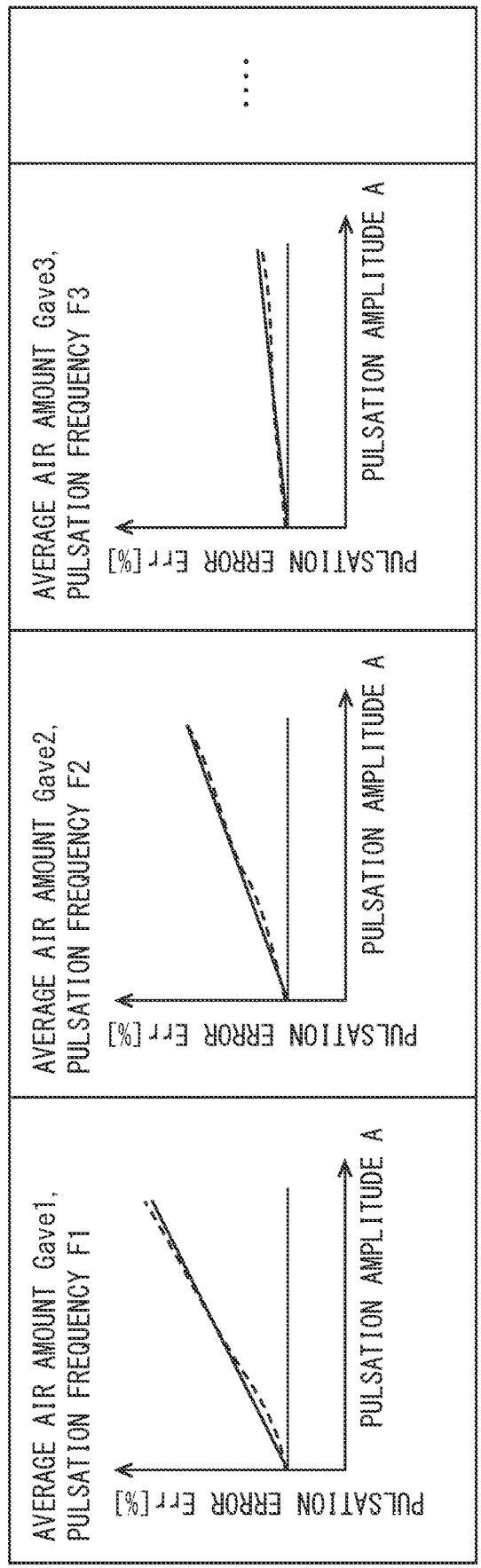
FIG. 14 is a diagram showing a pulsation amplitude—a pulsation error for each average air amount and each pulsation frequency according to the fifth embodiment.

The relationship between the pulsation error Err (%) and the pulsation amplitude A is different for each combination of multiple pulsation frequencies F and multiple average air amounts Gave, as shown in FIG. 14. A solid line in FIG. 14 indicates a relationship between the pulsation error Err after correction and the pulsation amplitude A. On the other hand, a dashed line indicates a relationship between the pulsation error Err before correction and the pulsation amplitude A, that is, a pulsation characteristic.

In the map, as shown in FIG. 13, a combination of the slope Cnn and the intercept Bnn correlated with respective combinations of the average air amount Gave and the pulsation frequency F is associated with each other. More specifically, in the two-dimensional map, for example, the average air amounts Gave1 to Gaven is taken on one axis and the pulsation frequencies F1 to Fn are taken on the other axis, and the respective combinations of the average air amounts Gave1 to Gaven and the pulsation frequencies F1 to Fn are associated with the respective combinations of the slope Cnn and the intercept Bnn. Each of the inclination Cnn and the intercept Bnn may be acquired by implementing an experiment or a simulation by using an actual equipment.

As described above, the map is used for acquiring the inclination Cnn and the intercept Bnn when calculating the pulsation error Err. In other words, in the map, coefficients in the error prediction equation are associated with the average air amount Gave, respectively, and the pulsation frequency F, respectively.

The pulsation error prediction unit 39*d* acquires the slope C11 and the intercept B11 with the use of the map, for example, when the pulsation amplitude A1, the pulsation frequency F1, and the average air amount Gave1 are used. The relationship between the pulsation amplitude A and the pulsation error Err can be represented by a solid line in the left end graph in FIG. 14. The pulsation error prediction unit 39*d* can acquire the pulsation error Err by calculating C11×pulsation amplitude A1+B11 by using Expression 3.

The AFM of the present embodiment configured as described above can exhibit the same effects as those of the AFM 100. In the present embodiment, since the pulsation error Err correlated with the pulsation amplitude A, the average air amount Gave, and the pulsation frequency F is predicted and corrected with the use of the pulsation error Err, the correction with higher accuracy can be performed than that when the correction is performed with the use of the pulsation error Err correlated with the pulsation amplitude A.

The pulsation error prediction unit 39*d* may use a pulsation rate P in place of the pulsation amplitude A. This example can be regarded as a combination of the second embodiment, the third embodiment, and the fourth embodiment.

In this case, the pulsation error prediction unit 39*d* predicts a pulsation error Err with the use of the pulsation frequency F, the average air amount Gave, and the pulsation rate P. The pulsation error prediction unit 39*d* predicts the pulsation error Err with the use of the pulsation rate P in place of the pulsation amplitude A. In this case, in the error prediction expression shown in Expression 3, the term of the pulsation amplitude A is changed to the pulsation rate P. As such, the similar effects as described above can be achieved.

(First Modification)

A first modification of the fifth embodiment will be described with reference to FIG. 15. A pulsation error prediction unit 39*d* according to the first modification is different from that of the fifth embodiment in that the pulsation error prediction unit 39*d* according to the first modification predicts the pulsation error Err (correction amount Q) by using a three-dimensional map.

The pulsation error prediction unit 39*d* acquires the correction information Q correlated with the pulsation amplitude A, the average air amount Gave, and the pulsation frequency F by using a map, in which the correction amount Q is associated with the pulsation amplitude A, the average air amount Gave, and the pulsation frequency F.

As shown in FIG. 15, the AFM includes a three-dimensional map including two-dimensional maps for respective pulsation amplitudes A. In the two-dimensional maps, multiple combinations of the average air amounts Gave and the pulsation frequencies F are associated with the correction amounts Q correlated to the combinations, respectively. For example, in the two-dimensional map related to the pulsation amplitude A1, the average air amounts Gave1 to Gaven is taken on one axis and the pulsation frequencies F1 to Fn are taken on the other axis, and the combinations of the average air amounts Gave1 to Gaven and the pulsation frequencies F1 to Fn are associated with the correction amounts Q111 to Q1*nn*, respectively. Each of the correction amounts Q111 to Q1*nn* can be considered to be a value obtained by each of combinations of the average air amounts Gave and the pulsation frequencies F when an experiment and a simulation using an actual machine are performed by changing the values of the average air amount Gave and the pulsation frequency F in case of the pulsation amplitude A1. The same applies to the two-dimensional map for the pulsation amplitude A2 and the following pulsation amplitude.

On acquiring the pulsation amplitude A, the average air amount Gave, and the pulsation frequency F, the pulsation error prediction unit 39*d* acquires the correction amount Q associated with these parameters by using the three-dimensional map. For example, in a case where the pulsation error prediction unit 39*d* acquires the pulsation amplitude A1, the average air amount Gave1, and the pulsation frequency F1, the pulsation error prediction unit 39*d* acquires the correction amount Q111.

The first modification enables to exhibit an effect similar to that of the fifth embodiment.

In the first modification, a pulsation rate P may be used in place of the pulsation amplitude A. The pulsation error prediction unit 39*d* acquires the correction amount Q by using a three-dimensional map including two-dimensional maps for respective pulsation rates P. In the two-dimensional maps, multiple combinations of the average air amounts Gave and the pulsation frequencies F are associated with the correction amounts Q correlated to the combinations, respectively. As such, the similar effects as described above can be achieved.

(Second Modification)

In this example, a second modification of the fifth embodiment will be described with reference to FIGS. 16 and 17. A pulsation error prediction unit 39*d* of this modification is different from the pulsation error prediction unit 39*d* of the fifth embodiment in that an error prediction expression used when predicting the pulsation error Err is changed according to the magnitude of the pulsation amplitude A.

In that instance, the pulsation error prediction unit 39*d* predicts the pulsation error Err correlated with the pulsation frequency F, the average air amount Gave, and the pulsation amplitude A with the use of, for example, a three-dimensional map shown in FIG. 17 and an error prediction expression described in Expressions 3 and 4.

$$\text{PULSATION ERROR Err}=Dnn \times A+Enn \quad \text{(Expression 4)}$$

In the error prediction expression described in Expression 4, Dnn is a slope and Enn is an intercept. The Expression 3 is similar as described above.

Figure 16:
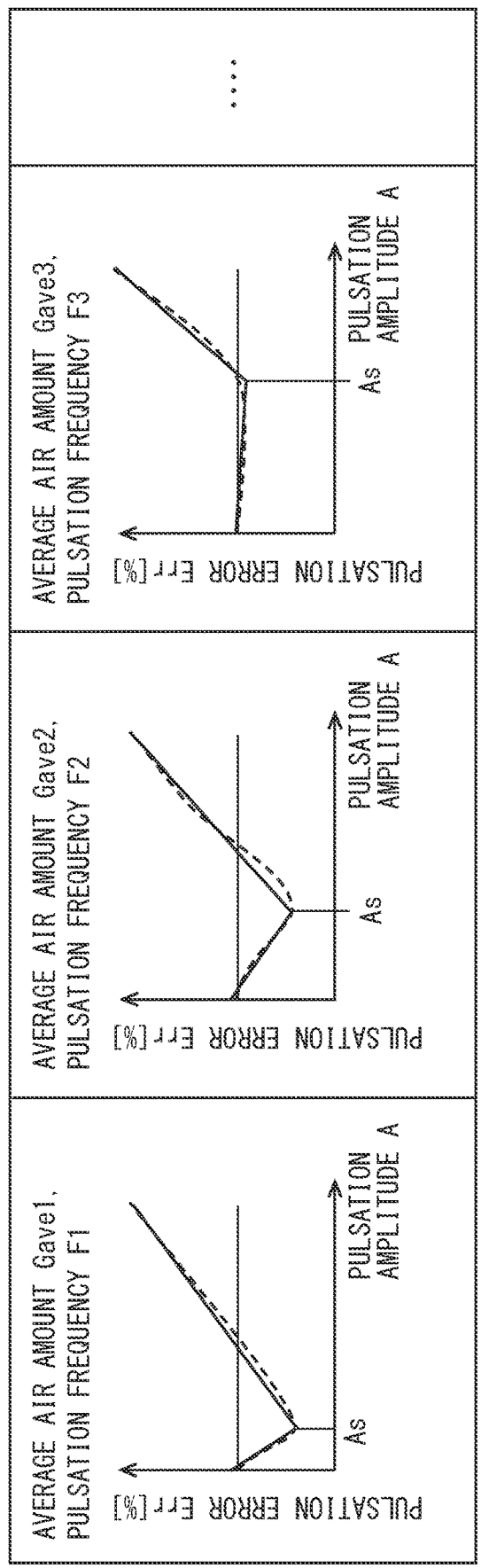
FIG. 16 is a diagram showing a pulsation amplitude—a pulsation error for each average air amount and each pulsation frequency according to a second modification of the fifth embodiment.

The relationship between the pulsation error Err and the pulsation amplitude A is different for each combination of multiple pulsation frequencies F and multiple average air amounts Gave, as shown in FIG. 16. The relationship between the pulsation error Err and the pulsation amplitude A has a different tendency with the threshold value As as the boundary even when the average air amount Gave and the pulsation frequency F are the same. That is, the relationship between the pulsation error Err and the pulsation amplitude A is reversed with the threshold value As as the boundary.

When the pulsation amplitude A is smaller than the threshold value As, the pulsation error Err decreases as the pulsation amplitude A increases. When the pulsation amplitude A is greater than the threshold value As, the pulsation error Err increases as the pulsation amplitude A increases. A solid line in FIG. 16 indicates a relationship between the pulsation error Err after correction and the pulsation amplitude A. On the other hand, a dashed line indicates a relationship between the pulsation error Err before correction and the pulsation amplitude A, that is, a pulsation characteristic.

As shown in FIG. 17, the map includes a two-dimensional map in the case of pulsation amplitude A<threshold value As and a two-dimensional map in the case of pulsation amplitude A>threshold value As. The two-dimensional map in the case of pulsation amplitude A<threshold value As is similar to the two-dimensional map shown in FIG. 13, and a combination of the slope Cnn and the intercept Bnn correlated with respective combinations of the average air amount Gave and the pulsation frequency F is associated with each other. In the two-dimensional map in the case of pulsation amplitude A>threshold value As, a combination of the slope Dnn and the intercept Enn correlated with respective combinations of the average air amount Gave and the pulsation frequency F is associated with each other. The two-dimensional map in this case is different in the slope Dnn and the intercept Enn from the two-dimensional map in the case of pulsation amplitude A<threshold value As.

The pulsation error prediction unit 39*d* acquires the slope C11 and the intercept B11 with the use of the map, for example, when the pulsation amplitude A1 (<As), the pulsation frequency F1, and the average air amount Gave1 are used. The pulsation error prediction unit 39*d* can acquire the pulsation error Err by calculating C11×pulsation amplitude A1+B11 by using Expression 3. The pulsation error prediction unit 39*d* acquires the slope D11 and the intercept E11 with the use of the map, for example, when the pulsation amplitude A2 (>As), the pulsation frequency F1, and the average air amount Gave1 are used. The pulsation error prediction unit 39*d* can acquire the pulsation error Err by calculating D11×pulsation amplitude A2+E11 by using Expression 4.

The second modification enables to exhibit an effect similar to that of the fifth embodiment. The pulsation error Err has a different tendency corresponding to the pulsation amplitude A even when the pulsation frequency F and the average air amount Gave are the same. Therefore, in the second modification, since the error prediction expression is switched according to the magnitude of the pulsation amplitude A, appropriate correction can be performed.

In the second modification, the error prediction expression can be switched depending on whether or not the backflow occurs by setting the threshold value As to the average air amount Gave. With this configuration, the second modification can be corrected with high accuracy even when a backflow occurs.

(Third Modification)

In this example, a third modification of the fifth embodiment will be described with reference to FIGS. 18 and 19. A pulsation error prediction unit 39*d* of this modification is different from the pulsation error prediction unit 39*d* of the second embodiment in that an error prediction expression used when predicting the pulsation error Err is changed according to the magnitude of the pulsation rate P.

Figure 18:
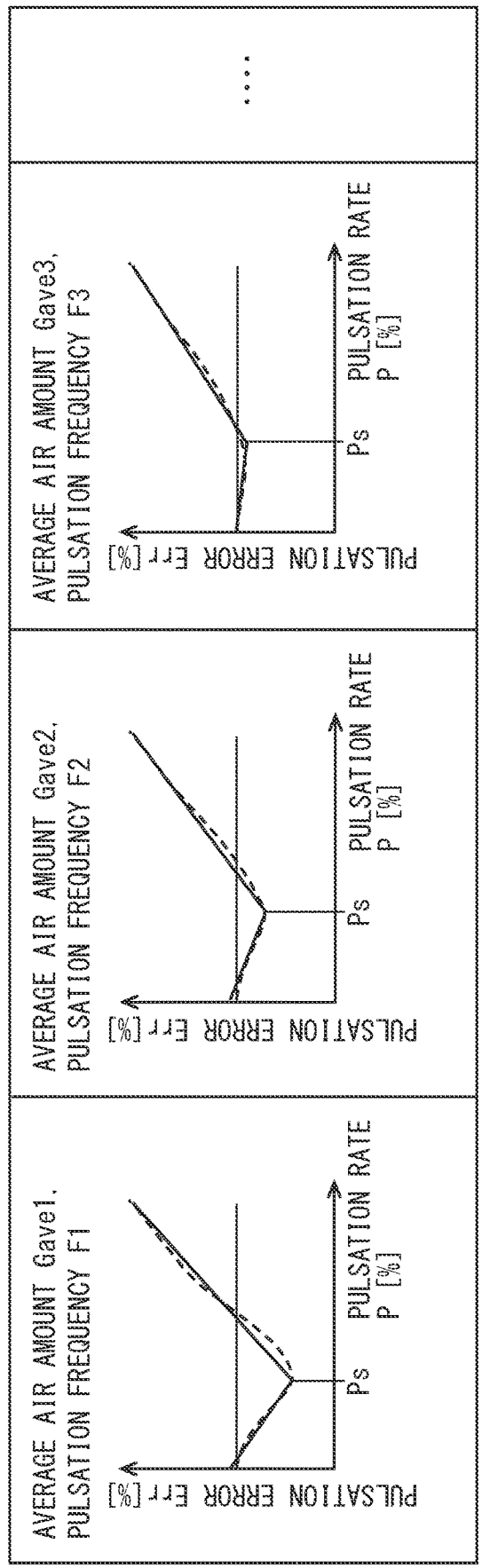
FIG. 18 is a diagram showing a pulsation rate—a pulsation error for each average air amount and each pulsation frequency according to a third modification of the fifth embodiment.

In that instance, the pulsation error prediction unit 39*d* predicts the pulsation error Err correlated with the pulsation frequency F, the average air amount Gave, and the pulsation rate P with the use of, for example, a three-dimensional map shown in FIG. 18 and an error prediction expression similar to Expressions 3 and 4. The error prediction expression used here is obtained by changing the term of the pulsation amplitude A in Equations 3 and 4 to the pulsation rate P. An expression in which the term of the pulsation amplitude A in Expression 3 changed to the pulsation rate P is called Expression 13, and an expression in which the term of the pulsation amplitude A in Expression 4 changed to the pulsation rate P is called Expression 14.

The relationship between the pulsation error Err and the pulsation rate P is different for each combination of multiple pulsation frequencies F and multiple average air amounts Gave, as shown in FIG. 18. The relationship between the pulsation error Err and the pulsation rate P has a different tendency with the threshold value Ps as the boundary even when the average air amount Gave and the pulsation frequency F are the same. That is, the relationship between the pulsation error Err and the pulsation rate P is reversed with the threshold value Ps as the boundary. When the pulsation rate P is smaller than the threshold value As, the pulsation error Err decreases as the pulsation rate P increases. When the pulsation rate P is smaller than the threshold value As, the pulsation error Err decreases as the pulsation rate P increases. A solid line in FIG. 18 indicates a relationship between the pulsation error Err after correction and the pulsation rate P. On the other hand, a dashed line indicates a relationship between the pulsation error Err before correction and the pulsation rate P, that is, a pulsation characteristic.

As shown in FIG. 19, the map includes a two-dimensional map in the case of pulsation rate P<threshold value Ps and a two-dimensional map in the case of pulsation rate P>threshold value Ps. The two-dimensional map in the case of pulsation rate P<threshold value Ps is similar to the two-dimensional map shown in FIG. 13, and a combination of the slope Cnn and the intercept Bnn correlated with respective combinations of the average air amount Gave and the pulsation frequency F is associated with each other. In the two-dimensional map in the case of pulsation rate P>threshold value Ps, a combination of the slope Dnn and the intercept Enn correlated with respective combinations of the average air amount Gave and the pulsation frequency F is associated with each other. The two-dimensional map in this case is different in the slope Dnn and the intercept Enn from the two-dimensional map in the case of pulsation rate P<threshold value Ps.

The pulsation error prediction unit 39*d* acquires the slope C11 and the intercept B11 with the use of the map, for example, when the pulsation rate P1 (<Ps), the pulsation frequency F1, and the average air amount Gave1 are used. The pulsation error prediction unit 39*d* can acquire the pulsation error Err by calculating C11×pulsation rate P1+B11 by using Expression 13. The pulsation error prediction unit 39*d* acquires the slope D11 and the intercept E11 with the use of the map, for example, when the pulsation rate P2 (>Ps), the pulsation frequency F1, and the average air amount Gave1 are used. The pulsation error prediction unit 39*d* can acquire the pulsation error Err by calculating D11×pulsation rate P2+E11 by using Expression 14.

As described above, the pulsation error prediction unit 39*d* according to the third modification predicts the pulsation error Err correlated with the pulsation rate P using a plurality of error prediction expressions. Each of the plurality of error prediction expressions has a different tendency of change in pulsation error Err with respect to change in pulsation rate P. Then, the pulsation error prediction unit 39*d* changes the error prediction expression according to the magnitude of the pulsation rate P.

The third modification enables to exhibit an effect similar to that of the fifth embodiment. The pulsation error Err has a different tendency corresponding to the pulsation rate P even when the pulsation frequency F and the average air amount Gave are the same. Therefore, in the third modification, since the error prediction expression is switched according to the magnitude of the pulsation rate P, appropriate correction can be performed.

In the third modification, the error prediction expression can be switched depending on whether or not the backflow occurs by setting the threshold value Ps to 100%. With this configuration, the third modification can be corrected with high accuracy even when a backflow occurs.

In the second modification, it is necessary to change the threshold value As based on the average air amount Gave. In the third modification, the error prediction expression can be switched depending on whether or not the backflow occurs by setting the threshold value Ps to 100%. Thus, in the third modification, the calculation can be simplified and the amount of memory can be reduced.

(Fourth Modification)

Further, the pulsation error prediction unit 39$d$ may calculate the correction amount Q by the following regression equation.

Correction amount $Q = \alpha G + \beta F + \gamma A$

G: average air amount, F: pulsation frequency, A: pulsation amplitude, $\alpha$, $\beta$, $\gamma$: constant The constants $\alpha$, $\beta$, and $\gamma$ are values determined by the passage formation member.

Sixth Embodiment

An AFM according to a sixth embodiment will be described with reference to FIGS. 20 to 22. In the AFM, a part of the processing unit 20 is different from that in the AFM 100. The AFM is different from the first embodiment in how to determine the measurement period for measuring the average air amount Gave and the pulsation maximum value Gmax. The AFM includes a pulsation cycle calculation unit 34$a$ and a measurement period calculation unit 34$b$ instead of the sampling storage unit 34 and the upper extreme value determination unit 35, respectively.

The pulsation cycle calculation unit 34$a$ calculates the pulsation cycle of air. More specifically, the pulsation cycle calculation unit 34$a$ calculates the pulsation cycle using the air flow rate converted by the output air flow rate conversion table 33.

The measurement period calculation unit 34$b$ changes the measurement period for obtaining the average air amount Gave and the pulsation maximum value Gmax corresponding to the pulsation cycle obtained by the pulsation cycle calculation unit 34$a$. Specifically, when the pulsation period is long, the measurement period calculation unit 34$b$ sets the measurement period longer compared when the pulsation period is short. For example, the measurement period calculation unit 34$b$ sets the pulsation cycle (one cycle) obtained by the pulsation cycle calculation unit 34$a$ as the measurement period.

Figure 21:
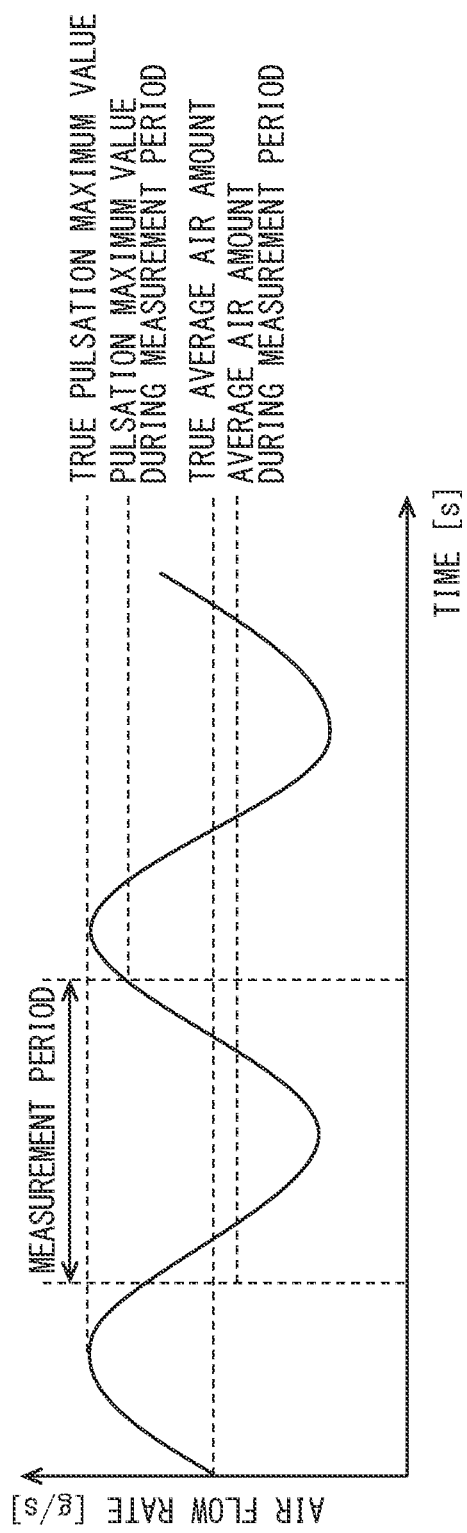
FIG. 21 is a waveform diagram showing a maximum flow rate and an average air amount when the measurement period is short according to the sixth embodiment.

For example, as shown in FIG. 21, when the measurement period is short with respect to the pulsation cycle, an error occurs between the true pulsation maximum value Gmax and the pulsation maximum value Gmax during the measurement period. Similarly, an error occurs between the true average air amount Gave and the average air amount Gave during the measurement period. Therefore, in this case, the accuracy of the pulsation error Err (correction amount Q) decreases.

Figure 22:
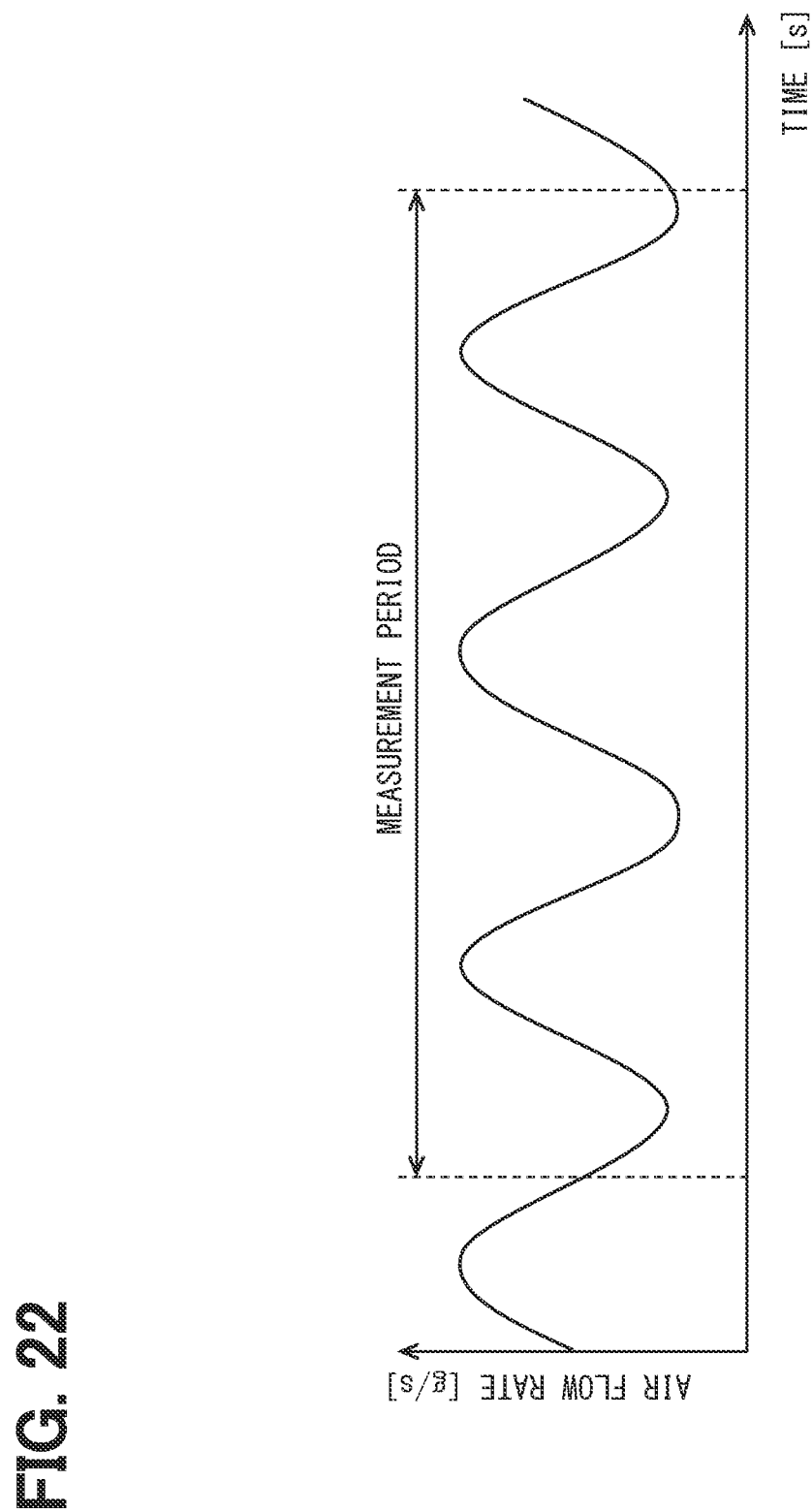
FIG. 22 is a waveform diagram showing a long measurement period according to the sixth embodiment.

As shown in FIG. 22, when the measurement period is long with respect to the pulsation cycle, the time until the average air amount Gave and the pulsation maximum value Gmax are obtained becomes long. Therefore, in this case, the time until the pulsation error Err (correction amount Q) is obtained is long, and the responsiveness is deteriorated.

Since the AFM changes the measurement period corresponding to the pulsation cycle as described above, it is possible to improve the calculation accuracy of the average air amount Gave and the maximum pulsation value Gmax and improve the responsiveness. The AFM of the sixth embodiment enables to exhibit a similar effect to that of the AFM 100.

Figure 20:
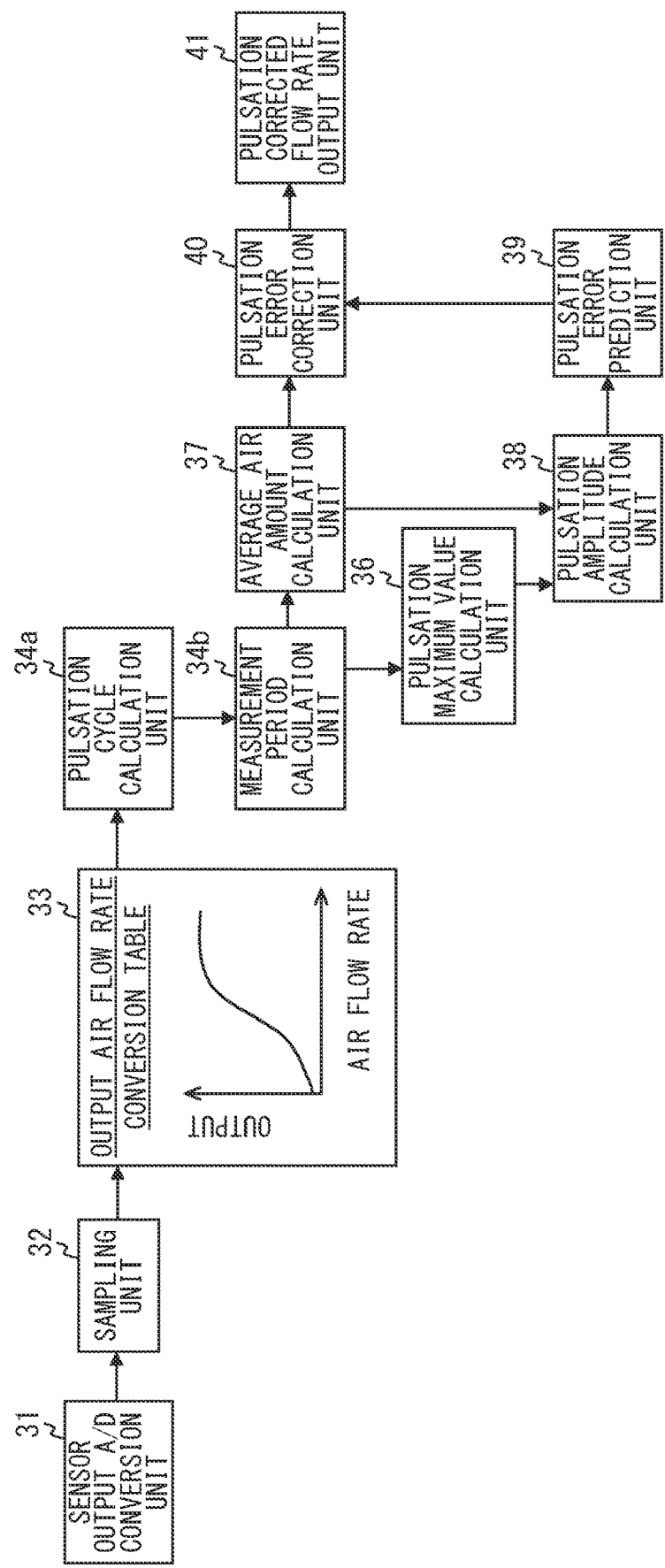
FIG. 20 is a block diagram showing a schematic configuration of a processing unit according to a sixth embodiment.

In the present embodiment, as shown in FIG. 20, an example in which the pulsation error Err is obtained using the pulsation amplitude A is employed. However, the present disclosure is not limited thereto, and in the second to fifth embodiments, a pulsation period calculation unit 34$a$ and a measurement period calculation unit 34$b$ may be employed instead of the sampling storage unit 34 and the upper extreme value determination unit 35.

Seventh Embodiment

Figure 23:
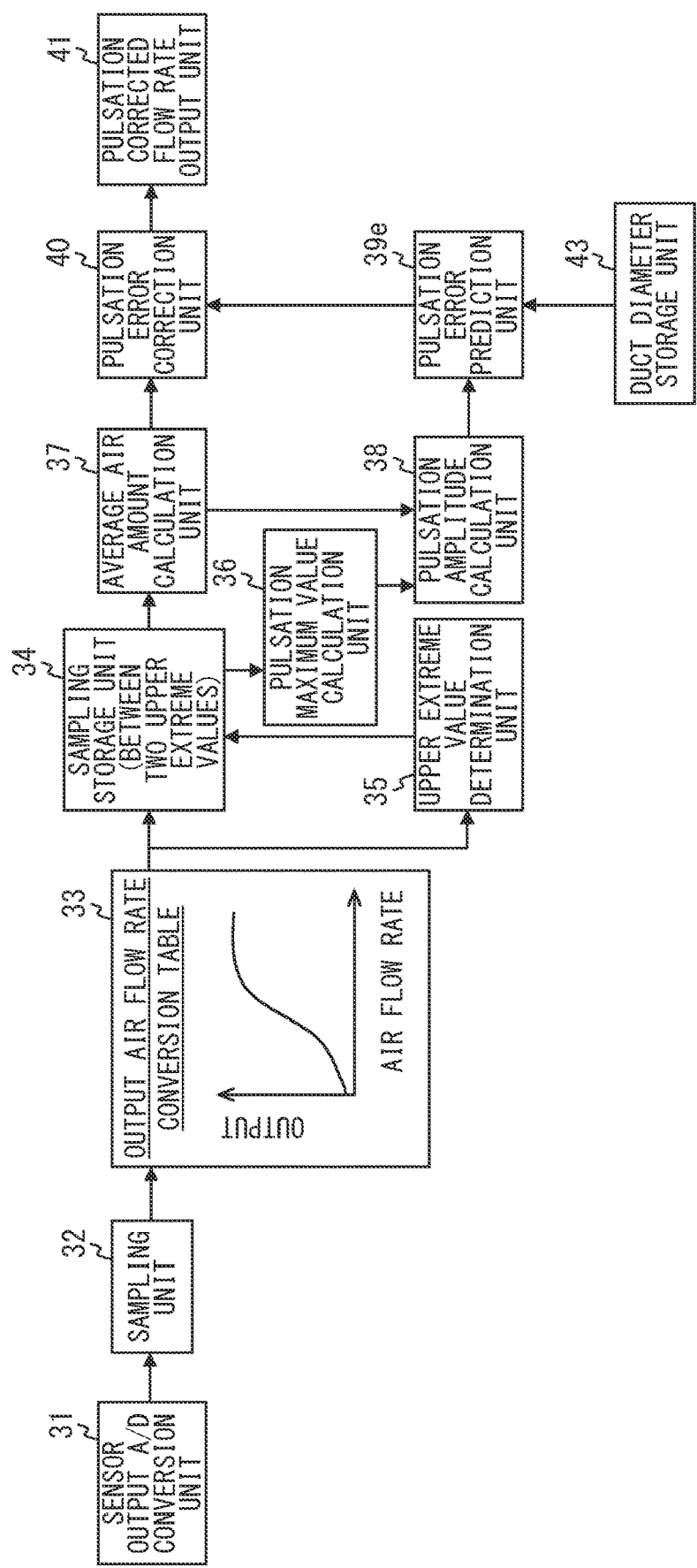
FIG. 23 is a block diagram showing a schematic configuration of a processing unit according to a seventh embodiment.
Figure 25:
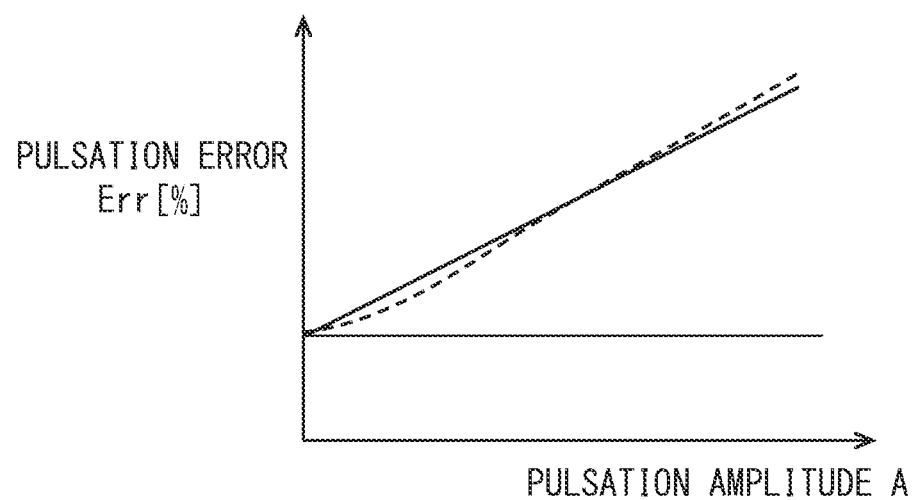
FIG. 25 is a diagram showing a pulsation amplitude—a pulsation error according to the seventh embodiment.

An AFM according to a seventh embodiment will be described with reference to FIGS. 23 to 25. In the AFM, a part of the processing unit 20 is different from that in the AFM 100. As shown in FIG. 23, the AFM includes a duct diameter storage unit 43 that stores the diameter of the duct (duct diameter H) on which the AFM is mounted. As shown in FIG. 23, the AFM is different from the AFM 100 in that the duct diameter H stored in the duct diameter storage unit 43 is input to the pulsation error prediction unit 39$e$.

The relationship between the pulsation error Err and the pulsation amplitude A is different for each combination of multiple pulsation frequencies F and multiple average air amounts Gave. The flow velocity distribution in the duct changes corresponding to the duct diameter H even when the average air amount Gave and the pulsation frequency F are the same so that the relationship between the pulsation error Err and the pulsation amplitude A differs corresponding to the duct diameter H. FIG. 25 shows the relationship between the pulsation error Err and the pulsation amplitude A when the duct diameter is H. The relationship is different depending on the duct diameter H as shown in FIG. 24.

The pulsation error prediction unit 39$e$ predicts a pulsation error Err with the use of the pulsation amplitude A, the pulsation frequency F, the average air amount Gave, and the duct diameter H. That is, the pulsation error prediction unit 39$e$ predicts the pulsation error Err correlated with the duct diameter H in addition to the pulsation amplitude A, the pulsation frequency F, and the average air amount Gave. In that instance, the pulsation error prediction unit 39$e$ predicts the pulsation error Err correlated with the pulsation amplitude A, the pulsation frequency F, the average air amount Gave, and the duct diameter H with the use of, for example, a three-dimensional map shown in FIG. 24 and the error prediction expression described in Expression 3.

As shown in FIG. 24, the AFM includes a three-dimensional map including two-dimensional maps for respective duct diameters H. In the two-dimensional maps, multiple combinations of the average air amounts Gave and the pulsation frequencies F are associated with the combinations of the slope Cnnn and the intercept Bnnn correlated to the combinations, respectively. More specifically, in each two-dimensional map, for example, the average air amounts Gave1 to Gaven is taken on one axis and the pulsation frequencies F1 to Fn are taken on the other axis, and the respective combinations of the average air amounts Gave1 to Gaven and the pulsation frequencies F1 to Fn are associated with the respective combinations of the slope Cnn and the intercept Bnn. Each of the inclination Cnnn and the intercept Bnnn may be acquired by implementing an experiment or a simulation by using an actual equipment. Each two-dimensional map is similar to the two-dimensional map in FIG. 13 or the like.

The pulsation error prediction unit 39e acquires the slope C111 and the intercept B111 with the use of the map, for example, when the duct diameter H1, the pulsation amplitude A1, the pulsation frequency F1, and the average air amount Gave1 are used. The pulsation error prediction unit 39e can acquire the pulsation error Err by calculating C111×pulsation amplitude A1+B111 by using Expression 3.

The AFM of the present embodiment configured as described above can exhibit the same effects as those of the AFM 100. In the present embodiment, since the pulsation error Err correlated with the pulsation amplitude A, the average air amount Gave, the pulsation frequency F, and the duct diameter H is predicted and corrected with the use of the pulsation error Err, the correction with higher accuracy can be performed than that when the correction is performed with the use of the pulsation error Err correlated with the pulsation amplitude A.

Eighth Embodiment

Figure 26:
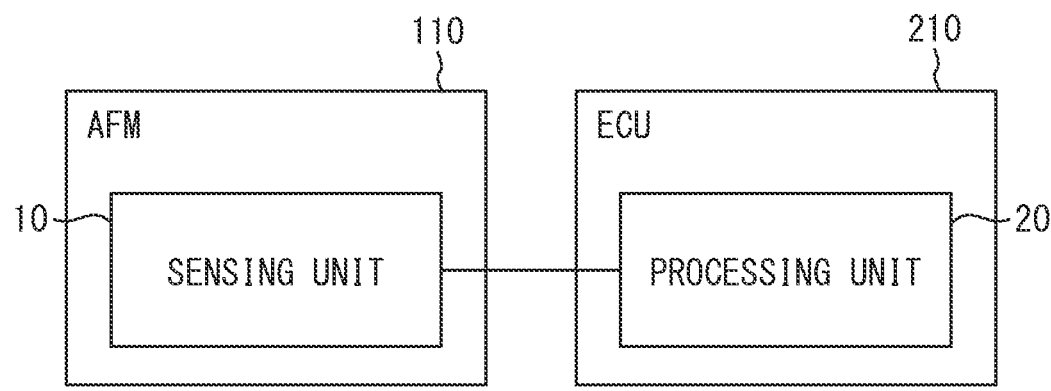
FIG. 26 is a block diagram showing a schematic configuration of an AFM according to an eighth embodiment.

A first modification of an eighth embodiment will be described with reference to FIG. 26. The eighth embodiment is different from the first embodiment in that a sensing unit 10 is provided on the AFM 110 and a processing unit 20 is provided on the ECU 210. In other words, in the present embodiment, the present disclosure is applied to the processing unit 20 provided in the ECU 210. The present disclosure may include the sensing unit 10 in addition to the processing unit 20.

In the present configuration, the AFM 110 and the ECU 210 enable to exhibit an effect similar to that of the AFM 100. Further, since the AFM 110 does not include the processing unit 20, a processing load can be reduced more than that of the AFM 100.

The eighth embodiment can also be applied to the second to seventh embodiments. In that instance, the processing unit in each embodiment is provided to the ECU 210. Therefore, the ECU 210 calculates the pulsation rate P, analyzes the pulsation frequency F, or the like.

Ninth Embodiment

Figure 27:
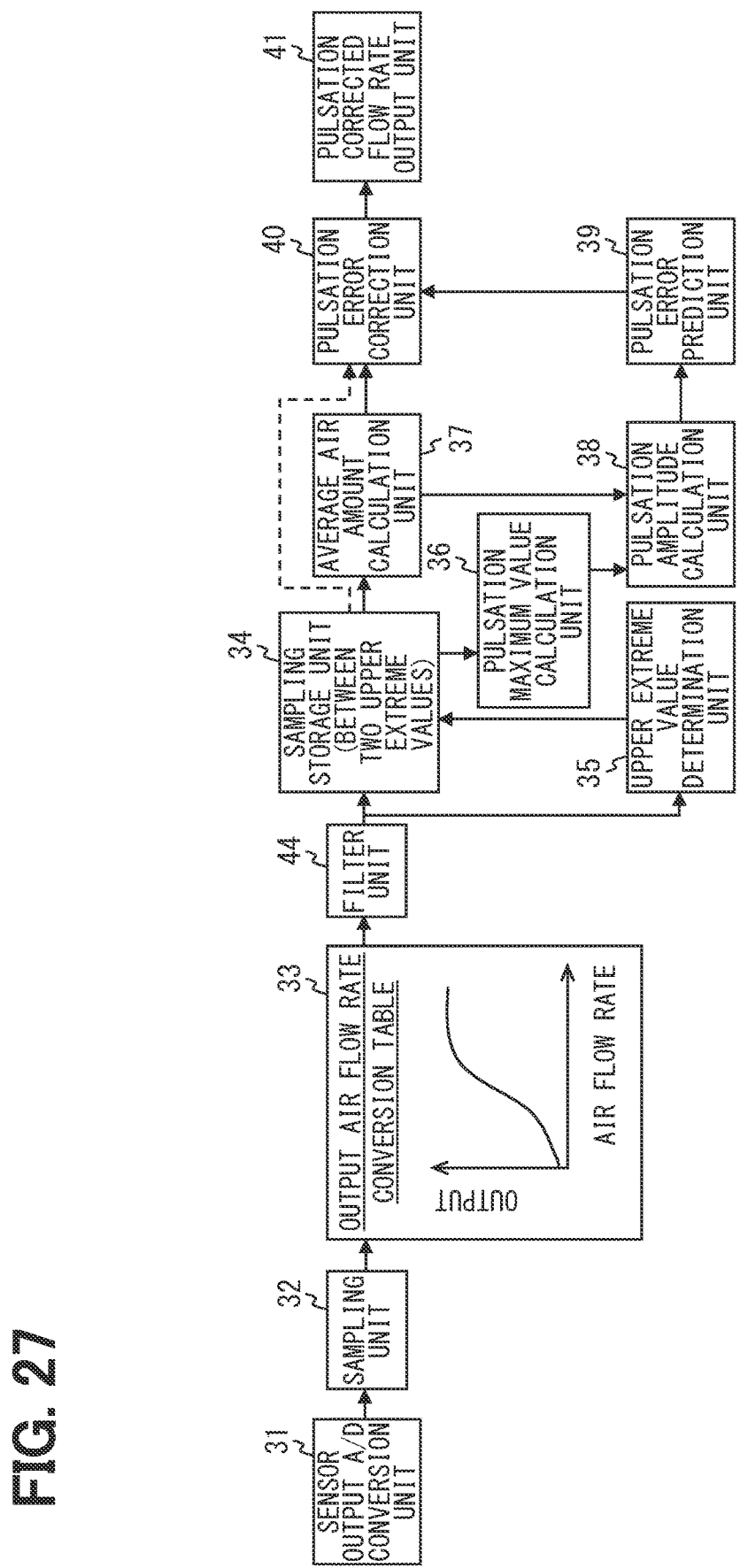
FIG. 27 is a block diagram showing a schematic configuration of a processing unit according to a ninth embodiment.
Figure 28:
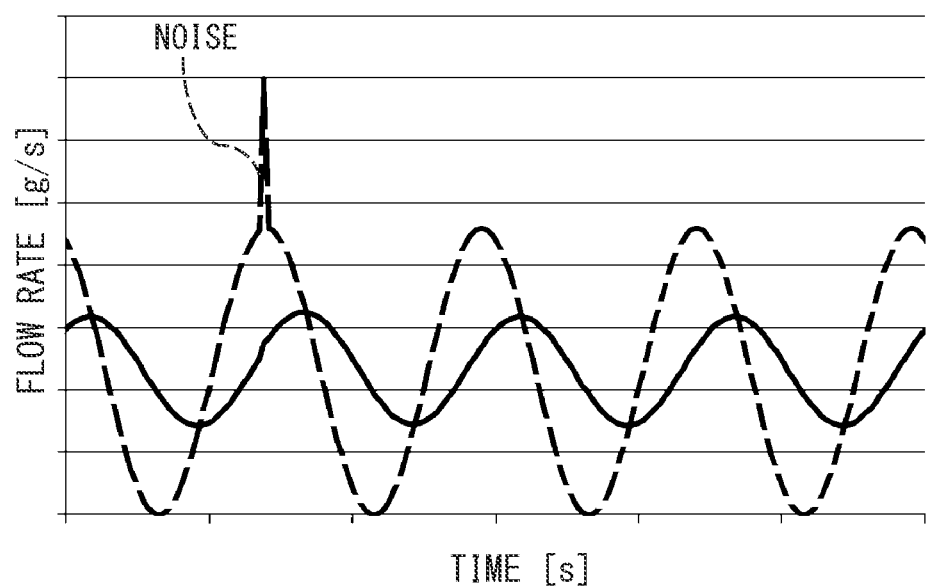
FIG. 28 is a waveform diagram showing a relationship between air flow rate and time according to the ninth embodiment.

An AFM according to a ninth embodiment will be described with reference to FIGS. 27 and 28. As shown in FIG. 27, the AFM is different from the AFM 100 in that a filter unit 44 is included. That is, it can also be conceived that the AFM of the present embodiment includes the processing unit 20 having the filter unit 44.

The filter unit 44 is provided before the sampling storage unit 34 and the upper extreme value determination unit 35. The filter unit 44 performs a filtering process on the output value (output signal) and outputs the processed output value. In the present embodiment, the processing unit 20 in which the filter unit 44 is provided between the output air flow rate conversion table 33, the sampling storage unit 34, and the upper extreme value determination unit 35 is employed. The processed output value can also be conceived that the processed output signal.

The filter unit 44 can employ, for example, a low-pass filter. In the waveform shown in FIG. 28, a dashed line shows the output signal before the filtering process, and the solid line shows the output signal after the filtering process. Note that the output signal after the filter process in FIG. 28 is a processed output signal when a low-pass filter with a time constant of 3 ms is adopted as the filter unit 44.

For this reason, the average air amount calculation unit 37 calculates the average air amount Gave from the processed output value as the output value. The pulsation maximum value calculation unit 36 obtains the pulsation maximum value Gmax from the processed output value as the output value.

The AFM of the ninth embodiment configured as described above can exhibit the similar effects to that of the AFM 100. Furthermore, as shown in FIG. 28, the AFM of the ninth embodiment can reduce the effect of output disturbance due to electrical noise or turbulence even when noise is superimposed on the output value. With this configuration, the detection accuracy of the upper extreme value can be improved.

The ninth embodiment can also be applied to the second to eighth embodiments. In that instance, the processing unit in each embodiment includes the filter 44.

Some of the sections may be further divided into a plurality of subsections or may be appropriately combined to configure a single section. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. An air flow measurement device configured to measure an air flow rate based on an output value of a sensing unit attached in an environment in which air flows, the air flow measurement device comprising:
    an average air amount calculation unit configured to calculate an average air amount in a predetermined measurement period, the average air amount being an average value of the air flow rate from the output value;
    a pulsation maximum value calculation unit configured to calculate a pulsation maximum value in the predetermined measurement period, the pulsation maximum value being a maximum value of the air flow rate from the output value; and
    a pulsation amplitude calculation unit configured to calculate a pulsation amplitude of the air flow rate by taking a difference between the pulsation maximum value and the average air amount.

2. The air flow measurement device according to claim 1, further comprising:

a pulsation error prediction unit configured to predict a pulsation error of the air flow rate correlated with the pulsation amplitude; and a pulsation error correction unit configured to correct the air flow rate to reduce the pulsation error using the pulsation error.

3. The air flow measurement device according to claim 2, further comprising:

a pulsation rate calculation unit configured to calculate a pulsation rate of the air flow rate by dividing the pulsation amplitude by the average air amount, wherein:

the pulsation error prediction unit predicts, as the pulsation error correlated with the pulsation amplitude, the pulsation error correlated with the pulsation rate.

4. The air flow measurement device according to claim 2, wherein:

the pulsation error prediction unit predicts the pulsation error further correlated with the average air amount.

5. The air flow measurement device according to claim 2, further comprising:

a frequency acquisition unit configured to acquire a pulsation frequency that is a frequency of a pulsation waveform in the air, wherein:

the pulsation error prediction unit predicts the pulsation error further correlated with the pulsation frequency acquired by the frequency acquisition unit.

6. The air flow measurement device according to claim 5, wherein:

the air flow measurement device is configured to acquire a signal that indicates an operating state of an internal combustion engine from an internal combustion engine control device, the internal combustion engine control device configured to control the internal combustion engine using the air flow rate corrected by the pulsation error correction unit; and the frequency acquisition unit acquires the signal from the internal combustion engine control device, and acquires the pulsation frequency based on the acquired signal.

7. The air flow measurement device according to claim 2, further comprising:

a pulsation cycle calculation unit configured to calculate a pulsation cycle of the air; and a measurement period calculation unit configured to change the predetermined measurement period, during which the average air amount and the maximum pulsation value are calculated, corresponding to the pulsation cycle calculated by the pulsation cycle calculation unit, wherein:

the measurement period calculation unit sets the predetermined measurement period longer when the pulsation cycle is long than when the pulsation cycle is short.

8. The air flow measurement device according to claim 2, wherein:

the sensing unit is attached in a duct, and measures the air flow rate of the air that flows in the duct;

the air flow measurement device further comprises a duct diameter storage unit configured to store a duct diameter of the duct; and the pulsation error prediction unit predicts the pulsation error further correlated with the duct diameter stored in the duct diameter storage unit.

9. The air flow measurement device according to claim 2, wherein:

the pulsation error prediction unit predicts the pulsation error correlated with the pulsation amplitude using a plurality of error prediction expressions;

each of the plurality of error prediction expressions has a different tendency of a change in the pulsation error with respect to a change in the pulsation amplitude; and the pulsation error prediction unit changes from one of the plurality of error prediction expressions to another one of the plurality of error prediction expressions corresponding to a magnitude of the pulsation amplitude.

10. The air flow measurement device according to claim 1, further comprising:

a filter unit configured to perform a filtering process on the output value, and output a processed output value, wherein:

the average air amount calculation unit calculates the average air amount from the processed output value as the output value; and the pulsation amplitude calculation unit calculates the pulsation maximum value from the processed output value as the output value.

11. The air flow measurement device according to claim 1, wherein:

the pulsation amplitude calculation unit includes a pulsation maximum value calculation unit configured to acquire a plurality of upper extreme values in the air flow rate from the output value, and calculate the pulsation maximum value from an average of the plurality of upper extreme values.

12. The air flow measurement device according to claim 1, wherein:

the predetermined measurement period is provided by more than one cycle for a pulsation cycle of the air.

13. An air flow measurement device configured to measure an air flow rate based on an output value of a sensing unit attached in an environment in which air flows, the air flow measurement device comprising a processor configured to:

calculate, in a predetermined measurement period, an average air amount that is an average value of the air flow rate from the output value;

calculate, in the predetermined measurement period, a pulsation maximum value that is a maximum value of the air flow rate from the output value; and calculate a pulsation amplitude of the air flow rate by taking a difference between the pulsation maximum value and the average air amount.

* * * * *